United States Patent
Moro-Ludena et al.

(10) Patent No.: US 11,192,633 B1
(45) Date of Patent: Dec. 7, 2021

(54) ACTIVE VIBRATION CONTROL FOR AERIAL VEHICLES

(71) Applicant: Amazon Technologies, Inc., Seattle, WA (US)

(72) Inventors: David Moro-Ludena, Arlington, MA (US); Benjamin Novak, Seattle, WA (US); Scott Harris, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 16/141,095

(22) Filed: Sep. 25, 2018

(51) Int. Cl.
*B64C 29/02* (2006.01)
*B64C 11/00* (2006.01)
*B64D 31/06* (2006.01)
*B64C 39/02* (2006.01)

(52) U.S. Cl.
CPC ............ *B64C 11/008* (2013.01); *B64C 29/02* (2013.01); *B64D 31/06* (2013.01); *B64C 39/024* (2013.01); *B64C 2201/027* (2013.01); *B64C 2201/123* (2013.01); *B64C 2220/00* (2013.01)

(58) Field of Classification Search
CPC ............ B64C 11/008; B64C 2201/027; B64C 39/024; B64D 31/06
See application file for complete search history.

(56) References Cited

U.S. PATENT DOCUMENTS

| | | | |
|---|---|---|---|
| 8,473,123 B2* | 6/2013 | Sun | B64C 27/20 701/3 |
| 9,613,539 B1* | 4/2017 | Lindskog | G08G 5/04 |
| 9,964,966 B1* | 5/2018 | Beckman | G05D 19/02 |
| 10,307,667 B2* | 6/2019 | Condon | A63F 13/00 |
| 2011/0189017 A1* | 8/2011 | Saucray | B64C 11/48 416/144 |
| 2012/0269626 A1* | 10/2012 | Winzenz | B64C 11/008 416/1 |
| 2020/0108939 A1* | 4/2020 | Tsaliah | B64C 39/024 |

\* cited by examiner

*Primary Examiner* — Brian M O'Hara
*Assistant Examiner* — Keith L Dixon
(74) *Attorney, Agent, or Firm* — Athorus, PLLC

(57) ABSTRACT

Systems and methods to actively control vibrations affecting an aerial vehicle are described. Vibrations affecting a location of interest on an aerial vehicle may be measured, and phases of one or more propellers of the aerial vehicle may be determined. Based on the measured vibrations and determined phases of propellers, adjustments to the phases of the propellers may be determined to modify the vibrations affecting the location of interest. In this manner, vibrations at a location of interest on an aerial vehicle may be reduced, minimized, increased, induced, or otherwise modified as desired.

20 Claims, 11 Drawing Sheets

ACTIVE VIBRATION CONTROL FOR AERIAL VEHICLES

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. While there are many beneficial uses of these vehicles, balancing the tightly coupled vehicle performance parameters of stability, maneuverability, and energy efficiency introduces design complexities of the UAVs. In addition, UAVs having multiple propulsion mechanisms may experience various vibrations and forces during operation that may adversely affect the structure, components, control systems, or other aspects of UAVs. Accordingly, there is a need for systems and methods to reduce, minimize, or otherwise modify vibrations and forces during various UAV operations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1A:
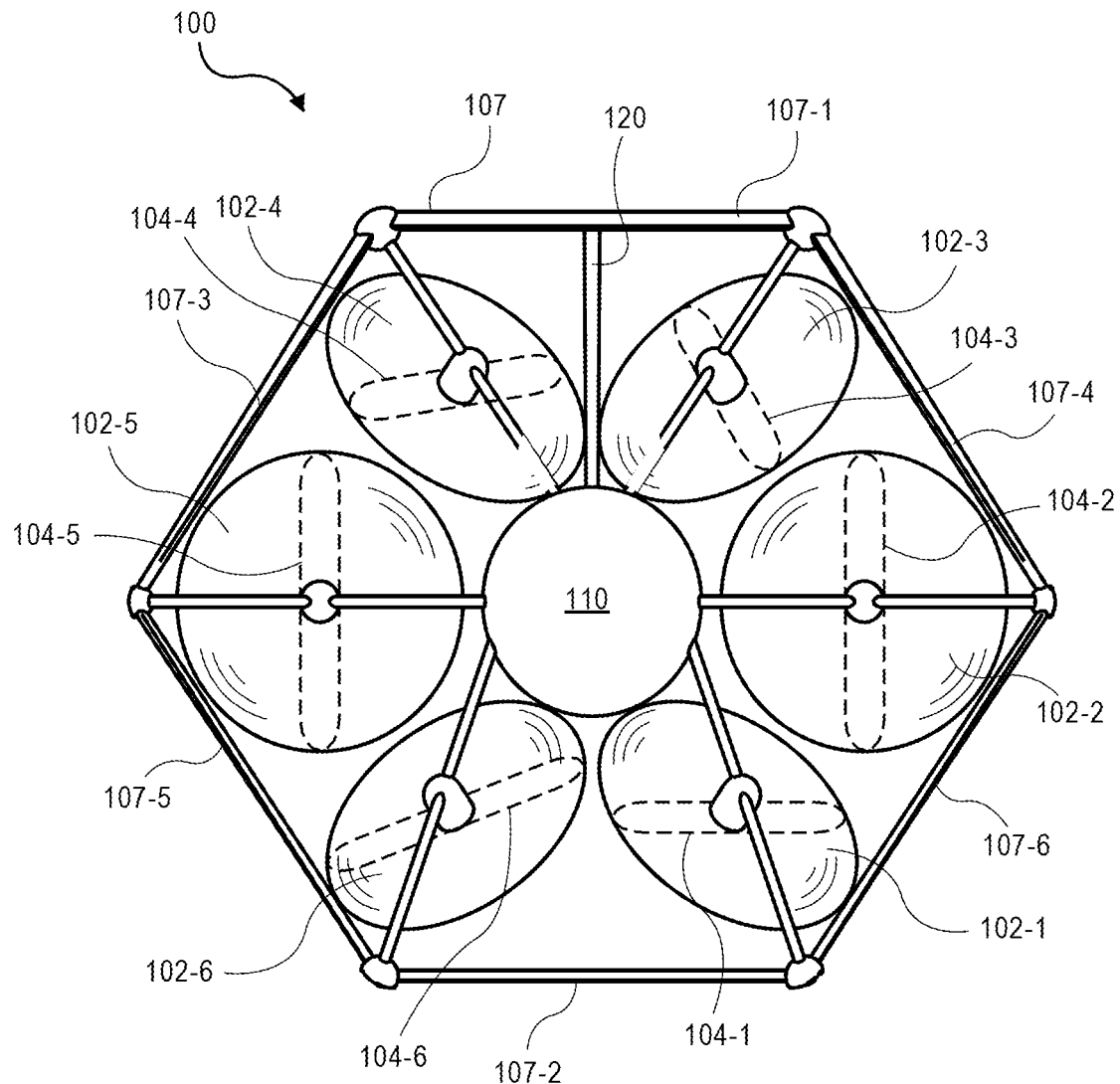
FIG. 1A illustrates a front view of an aerial vehicle with a substantially hexagonal shaped ring wing and one or more propellers out-of-phase, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes aerial vehicles, such as UAVs (e.g., quad-copters, hex-copters, hepta-copters, octa-copters) that can operate in a vertical takeoff and landing (VTOL) orientation or in a horizontal flight orientation. Some of the example aerial vehicles described herein may be able to transition independently in any of the six degrees of freedom in a VTOL orientation. Specifically, as described herein, the aerial vehicles may efficiently rotate in any of the three degrees of freedom of rotation (pitch, yaw, and roll) and/or may efficiently move in any of the three degrees of freedom of translation (surge, heave, and sway). For example, the aerial vehicle may include six propulsion mechanisms that are oriented at different angles and therefore, together, can provide thrust in the vertical direction and/or the horizontal direction when the aerial vehicle is in a VTOL orientation.

As discussed further below, a ring wing may be included on the aerial vehicle that surrounds the propulsion mechanisms of the aerial vehicle and provides both protection around the propulsion mechanisms and lift when the aerial vehicle is in the horizontal flight orientation and navigating in a substantially horizontal direction.

In example embodiments, the aerial vehicles described herein may implement various systems, methods, or processes to modify vibrations or forces experienced by the aerial vehicles. For example, vibrations or forces experienced by an aerial vehicle may be measured, e.g., by an inertial measurement unit of the aerial vehicle. In addition, phases of a plurality of propulsion mechanisms of the aerial vehicle may be determined, e.g., by state estimators associated with motor controllers. Then, respective phases of one or more propulsion mechanisms may be adjusted to modify the vibrations or forces experienced by the aerial vehicle, e.g., by adjusting rotational rates of one or more propulsion mechanisms.

In some example embodiments, vibrations or forces at one or more locations of interest may be measured and modified by corresponding adjustments to one or more propulsion mechanisms. For example, vibration at an imaging device of an aerial vehicle may be reduced during takeoff or landing operations that utilize imaging data from the imaging device. In addition, vibration at sensitive, damaged, or structurally compromised portions of an aerial vehicle may be reduced, e.g., while navigating the aerial vehicle to a safe landing location for maintenance or repairs.

In further example embodiments, vibrations or forces at one or more locations of interest may be induced by corresponding adjustments to one or more propulsion mechanisms. For example, induced vibrations or forces may be compared with expected vibrations or forces to determine the presence of faults or failures associated with a structure, one or more components, one or more joints, or other portions of an aerial vehicle. In addition, vibrations or forces may be induced at a location of interest to achieve other purposes, e.g., to remove debris, precipitation, ice, or other foreign materials from a portion of an aerial vehicle.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using an aerial vehicle. For example, an item carried by a payload of an aerial vehicle discussed herein may be ordered by a customer of an electronic commerce website and aerially delivered by the aerial vehicle to a delivery location.

FIG. 1A illustrates a front view of an aerial vehicle 100 with a substantially hexagonal shaped ring wing 107 and one or more propellers 104 out-of-phase, in accordance with disclosed implementations.

As described herein in further detail, the aerial vehicle 100 may include six propulsion mechanisms 102-1, 102-2, 102-3, 102-4, 102-5, 102-6, each propulsion mechanism 102 including a respective motor and corresponding propeller 104-1, 104-2, 104-3, 104-4, 104-5, 104-6. Each of the propulsion mechanisms 102 may be coupled to a respective motor arm, and the six motor arms may be coupled to and extend from a fuselage 110. In addition, a ring wing 107 including wing sections 107-1, 107-2, 107-3, 107-4, 107-5, 107-6 may be coupled to ends of the six motor arms and encompass or surround the six propulsion mechanisms 102 and the fuselage 110. Further, a stabilizer fin 120 may also be coupled between the fuselage 110 and the ring wing 107.

In some example embodiments of the aerial vehicle 100, as described herein in further detail, one or more of the propulsion mechanisms 102 may be angled relative to each other and/or relative to a direction of travel of the aerial vehicle 100. For example, during horizontal flight of the aerial vehicle 100 (which is generally straight out of the page of FIG. 1A), propulsion mechanisms 102-2 and 102-5 may have axes of rotation that are substantially aligned with the direction of travel. In addition, propulsion mechanisms 102-3 and 102-4 may have axes of rotation that are angled away from each other by approximately the same angle, such that their axes of rotation are angled with respect to the direction of travel. Similarly, propulsion mechanisms 102-1 and 102-6 may have axes of rotation that are angled toward each other by approximately the same angle, such that their axes of rotation are also angled with respect to the direction of travel.

In such example embodiments of the aerial vehicle 100 in horizontal flight, the propulsion mechanisms 102-1, 102-3, 102-4, 102-6 may be considered to be in crossflow because their axes of rotation are angled with respect to the direction of travel. In addition, propulsion mechanisms that are in crossflow may generate vibrations and forces that affect all or a portion of the aerial vehicle. For example, the vibrations and forces may comprise asymmetric forces, lateral forces, cyclic or oscillatory forces, roll moments, yaw moments, pitch moments, or other forces, moments, or vibrations. Further, the propulsion mechanisms 102-2 and 102-5 may also generate vibrations and forces that affect all or a portion of the aerial vehicle, even though the propulsion mechanisms 102-2 and 102-5 have axes of rotation that are substantially aligned with the direction of travel.

During various operations of the propulsion mechanisms 102 of the aerial vehicle 100, respective phases of propellers 104 of each of the propulsion mechanisms 102 may be in various positions or states. For example, as shown in FIG. 1A, propellers 104-3 and 104-4 may have phases that are out-of-phase with each other at a particular instant of time. In example embodiments, propellers 104-3 and 104-4 may rotate in opposite rotational directions, and phases that are out-of-phase may refer to phases of the propellers 104-3 and 104-4 that are not mirror images of each other. Likewise, as shown in FIG. 1A, propellers 104-1 and 104-6 may also have phases that are out-of-phase with each other at a particular instant of time. In example embodiments, propellers 104-1 and 104-6 may also rotate in opposite rotational directions, and phases that are out-of-phase may refer to phases of the propellers 104-1 and 104-6 that are not mirror images of each other. Further, propellers 104-2 and 104-5 may also have phases that are out-of-phase with each other at a particular instant of time. In example embodiments, propellers 104-2 and 104-5 may also rotate in opposite rotational directions, and phases that are out-of-phase may refer to phases of the propellers 104-2 and 104-5 that are not mirror images of each other.

Because propellers 104-3 and 104-4 are out-of-phase with each other and propellers 104-1 and 104-6 are also out-of-phase with each other, and also potentially because propellers 104-2 and 104-5 are also out-of-phase with each other, various vibrations and forces as described herein may affect all or a portion of the aerial vehicle.

For example, one propeller, e.g., propeller 104-3, may generate various asymmetric forces, lateral forces, cyclic or oscillatory forces, roll moments, yaw moments, pitch moments, or other forces, moments, or vibrations, and the other propeller, e.g., propeller 104-4, of the pair may also generate various asymmetric forces, lateral forces, cyclic or oscillatory forces, roll moments, yaw moments, pitch moments, or other forces, moments, or vibrations. Likewise, one propeller, e.g., propeller 104-1, may generate various asymmetric forces, lateral forces, cyclic or oscillatory forces, roll moments, yaw moments, pitch moments, or other forces, moments, or vibrations, and the other propeller, e.g., propeller 104-6, of the pair may also generate various asymmetric forces, lateral forces, cyclic or oscillatory forces, roll moments, yaw moments, pitch moments, or other forces, moments, or vibrations. In addition, similar vibrations and forces may be generated by propellers 104-2 and 104-5.

The vibrations and forces affecting all or a portion of an aerial vehicle may have various adverse effects on portions of the aerial vehicle. For example, one or more structural components or elements of the aerial vehicle may weaken or degrade due to vibrations and forces affecting the aerial vehicle. In addition, one or more joints or couplings of the aerial vehicle may also weaken, degrade, or separate due to vibrations and forces affecting the aerial vehicle. Further, one or more sensors, avionics components, motors, actuators, processors, controllers, or other electronic components may also degrade or operate suboptimally due to vibrations and forces affecting the aerial vehicle. As one example, a sensor such as an imaging device may operate suboptimally, and/or data received from the sensor such as imaging data received from an imaging device may not be usable, due to vibrations and forces affecting the aerial vehicle.

Figure 1B:
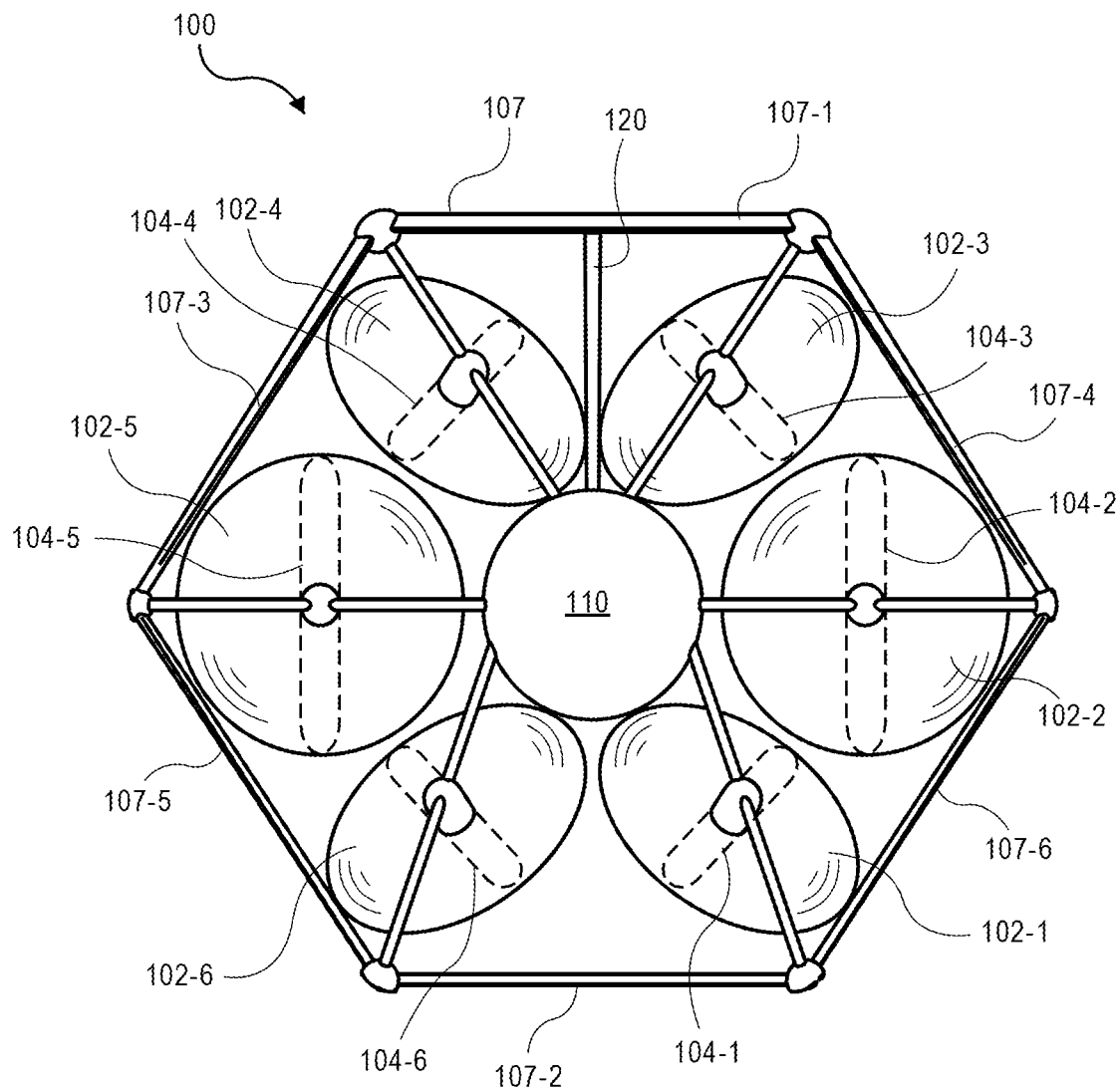
FIG. 1B illustrates a front view of an aerial vehicle with a substantially hexagonal shaped ring wing and one or more propellers in-phase, in accordance with disclosed implementations.

FIG. 1B illustrates a front view of an aerial vehicle 100 with a substantially hexagonal shaped ring wing 107 and one or more propellers 104 in-phase, in accordance with disclosed implementations.

Continuing with the example aerial vehicle 100 described herein with reference to FIG. 1A, the aerial vehicle 100 shown in FIG. 1B may be modified to reduce, minimize, or otherwise modify the vibrations and forces affecting all or a portion of the aerial vehicle.

As shown in FIG. 1B, one or both of propellers 104-3 and 104-4 may be adjusted to have phases that are in-phase with each other at a particular instant of time. In example embodiments, propellers 104-3 and 104-4 may rotate in opposite rotational directions, and phases that are in-phase may refer to phases of the propellers 104-3 and 104-4 that are substantially mirror images of each other. Likewise, one or both of propellers 104-1 and 104-6 may also be adjusted to have phases that are in-phase with each other at a particular instant of time. In example embodiments, propellers 104-1 and 104-6 may also rotate in opposite rotational directions, and phases that are in-phase may refer to phases of the propellers 104-1 and 104-6 that are also substantially mirror images of each other. Further, one or both of propellers 104-2 and 104-5-5 may also be adjusted to have phases that are in-phase with each other at a particular instant of time. In example embodiments, propellers 104-2 and 104-5 may also rotate in opposite rotational directions, and phases that are in-phase may refer to phases of the propellers 104-2 and 104-5 that are also substantially mirror images of each other.

Because propellers 104-3 and 104-4 are in-phase with each other and propellers 104-1 and 104-6 are also in-phase with each other, and also potentially because propellers 104-2 and 104-5 are also in-phase with each other, various vibrations and forces as described herein may be reduced, minimized, or otherwise modified.

For example, various asymmetric forces, lateral forces, cyclic or oscillatory forces, roll moments, yaw moments, pitch moments, or other forces, moments, or vibrations generated by one propeller, e.g., propeller 104-3, may be substantially canceled out by various asymmetric forces, lateral forces, cyclic or oscillatory forces, roll moments, yaw moments, pitch moments, or other forces, moments, or vibrations generated by the other propeller, e.g., propeller 104-4, of the pair. Likewise, various asymmetric forces, lateral forces, cyclic or oscillatory forces, roll moments, yaw moments, pitch moments, or other forces, moments, or vibrations generated by one propeller, e.g., propeller 104-1, may be substantially canceled out by various asymmetric forces, lateral forces, cyclic or oscillatory forces, roll moments, yaw moments, pitch moments, or other forces, moments, or vibrations generated by the other propeller, e.g., propeller 104-6, of the pair. In addition, vibrations and forces generated by propellers 104-2 and 104-5 may also substantially cancel each other out.

The phase of a propeller 104 may be adjusted by various methods, such as by modifying a rotational rate of a respective motor that rotates the propeller 104, by modifying a drag experienced by the propeller 104, by actuating one or more control surfaces of the propeller 104, and/or by other methods. By adjusting a plurality of propellers or propulsion mechanisms to have phases that are in-phase, vibrations and forces affecting all or a portion of the aerial vehicle may be reduced, minimized, or otherwise modified, e.g., the vibrations and forces may be substantially canceled out. In this manner, vibrations and forces affecting structural components, joints, couplings, sensors, avionics components, motors, actuators, processors, controllers, other electronic components, or other portions of an aerial vehicle may be reduced, minimized, or otherwise modified as desired.

In example embodiments, modifying vibrations and forces may comprise reducing, minimizing, increasing, and/or inducing vibrations and forces affecting all or a portion of the aerial vehicle. For example, reducing or minimizing vibrations and forces affecting all or a portion of an aerial vehicle may improve safety, reliability, or operations of one or more components or portions of the aerial vehicle. In addition, reducing or minimizing vibrations and forces affecting all or a portion of an aerial vehicle may facilitate particular operations of one or more components or portions of the aerial vehicle, e.g., using one or more sensors or imaging devices during portions of a flight plan. Further, increasing or inducing vibrations and forces affecting all or a portion of an aerial vehicle may also facilitate particular operations of one or more components or portions of the aerial vehicle, e.g., removing debris, precipitation, ice, or other foreign materials from one or more components or portions of the aerial vehicle.

Furthermore, although particular combinations or orientations of phases of propellers 104 are shown in FIG. 1B by which vibrations and forces affecting all or a portion of an aerial vehicle may substantially cancel each other out, various other combinations or orientations of phases of propellers 104 may also be used based at least in part on the desired modification, including but not limited to reduction, minimization, increase, and/or inducement, of vibrations and forces affecting all or a portion of an aerial vehicle. For example, various other combinations or orientations of phases of propellers may substantially cancel out vibrations and forces for the aerial vehicle as a whole, may substantially cancel out vibrations and forces at one or more particular locations of interest on an aerial vehicle, and/or may increase or induce vibrations and forces at one or more particular locations of interest on an aerial vehicle. Moreover, although the adjustment of phases of propellers is described herein in the context of canceling out vibrations and forces for pairs of propellers or propulsion mechanisms, in other example embodiments, the adjustment of phases of propellers may be determined based on desired modifications to vibrations and forces generated by one or more propellers or propulsion mechanisms, or various other groups or subsets of propellers or propulsion mechanisms.

Figure 2:
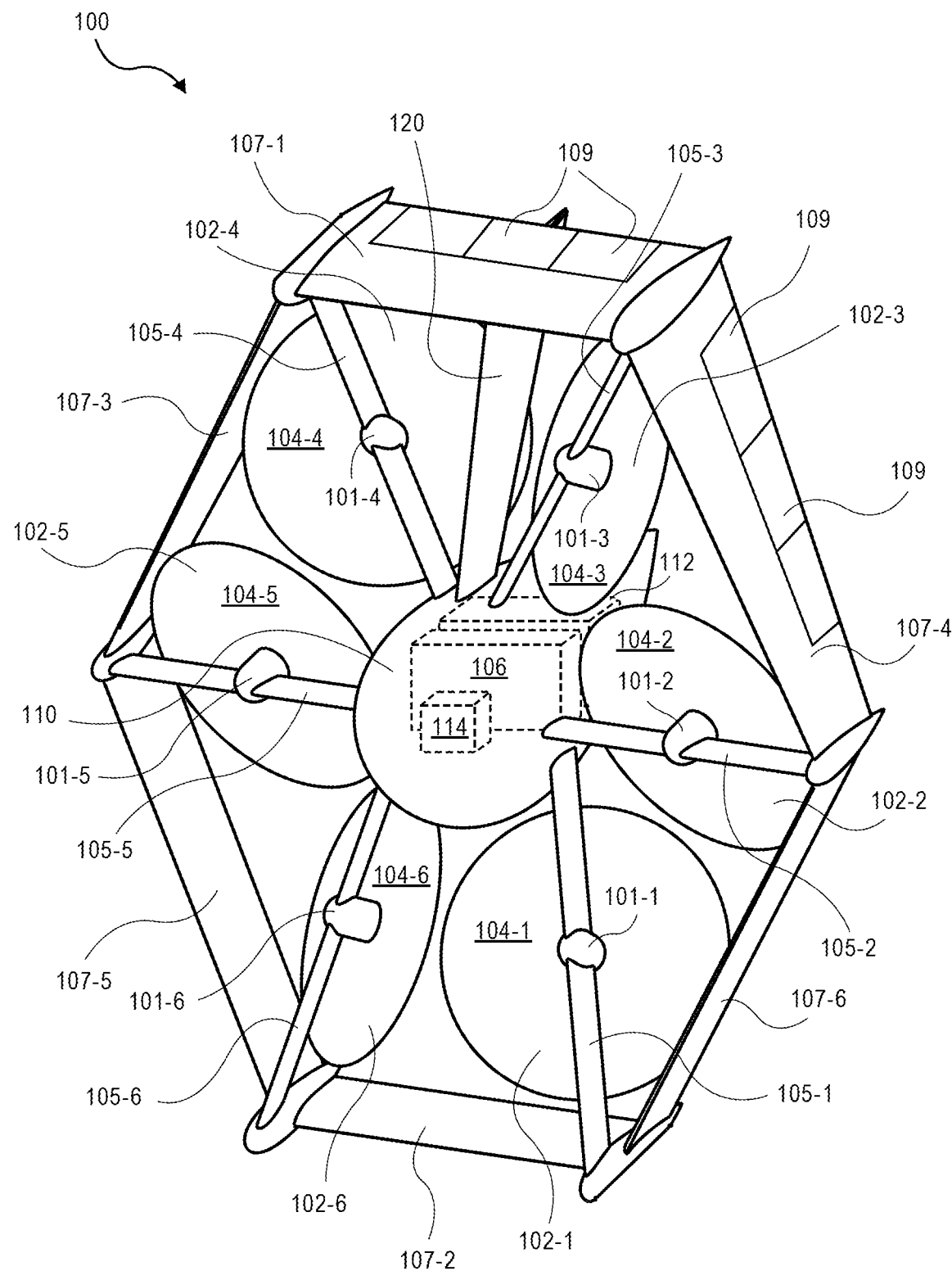
FIG. 2 illustrates a perspective view of an aerial vehicle with a substantially hexagonal shaped ring wing, in accordance with disclosed implementations.

FIG. 2 illustrates a perspective view of an aerial vehicle 100 with a substantially hexagonal shaped ring wing 107 that surrounds a plurality of propulsion mechanisms, in accordance with disclosed implementations. The aerial vehicle 100 includes six propulsion mechanisms 102-1, 102-2, 102-3, 102-4, 102-5, and 102-6 spaced about the fuselage 110 of the aerial vehicle 100. As discussed herein, while the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanisms may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 2 and moving in a direction that is substantially horizontal. As illustrated, and discussed further below, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 may be coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the stabilizer fin extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, plastics, metals, aluminum, steel, other materials, or combinations thereof.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 2 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5. In some implementations, the propulsion mechanisms that are not aligned to produce substantially horizontal forces may be allowed to freely rotate in the wind and energy produced from the rotation may be used to charge a power module of the aerial vehicle 100.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 2.

The angle of orientation of each of the propulsion mechanisms 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 2, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

When oriented for vertical takeoff and landing (VTOL) flight, the aerial vehicle may maneuver in any of the six degrees of freedom (pitch, yaw, roll, heave, surge, and sway), thereby enabling VTOL and high maneuverability. When the aerial vehicle is oriented for VTOL, the motor arms and the ring wing 107 are aligned approximately horizontally and in the same plane. In this orientation, each of the propulsion mechanisms are offset or angled with respect to the horizontal and/or vertical direction. As such, each propulsion mechanism 102, when generating a force, generates a force that includes both a horizontal component and a vertical component. In an example, each propulsion mechanism may be angled approximately thirty degrees with respect to vertical. Likewise, as discussed above, adjacent propulsion mechanisms are angled in opposing directions to form pairs of propulsion mechanisms. For example, propulsion mechanism 102-2 is oriented toward propulsion mechanism 102-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 100 is oriented for VTOL with angled propulsion mechanisms, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 107 during horizontal flight, as illustrated in FIG. 2, the fuselage is rotated at an angle when the aerial vehicle 100 is oriented for VTOL. In this example, the fuselage 110 is angled at approximately thirty degrees from vertical. In other implementations, the amount of rotation from vertical may be greater or less depending on the amount of offset desired for the ring wing 107 when the aerial vehicle 100 is oriented for horizontal flight.

The aerial vehicle may also include one or more landing gears that are extendable to a landing position in VTOL flight. During flight, the landing gear may be retracted into the interior of the ring wing 107 and/or may be rotated up and remain along the trailing edge of the ring wing. In still other examples, the landing gear may be permanently affixed.

The fuselage 110 may be used to house or store one or more components of the aerial vehicle, such as the aerial vehicle control system 114, a power module 106, and/or a payload 112 that is transported by the aerial vehicle. The aerial vehicle control system 114 is discussed further below. The power module(s) 106 may be removably mounted to the aerial vehicle 100. The power module(s) 106 for the aerial vehicle may be, for example, in the form of battery power, solar power, gas power, super capacitor, fuel cell, alternative power generation source, or a combination thereof. The power module(s) 106 are coupled to and provide power for the aerial vehicle control system 114, the propulsion mechanisms 102, and a payload engagement module to enable access to payload 112 within the fuselage 110.

In some implementations, one or more of the power modules 106 may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 112 may be any payload that is to be transported by the aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer specified delivery location using the aerial vehicle 100.

In some implementations, the fuselage 110 may include a payload engagement module (not shown). For example, the payload engagement module may be a hinged portion of the fuselage 110 that can rotate between an open position, in which the interior of the fuselage is accessible so that the payload 112 may be added to or removed from the fuselage, and a closed position so that the payload 112 is secured within the interior of the fuselage.

As illustrated in FIG. 2, the ring wing 107 is angled such that the lower segment 107-2 of the ring wing is positioned ahead of the upper segment 107-1 of the ring wing 107. The leading wing, lower segment 107-2 produces a much higher lift per square inch than the rear wing, upper segment 107-1, and the chord length of the lower segment 107-2 is less than the chord length of the upper segment 107-1. Likewise, as illustrated, the upper segment 107-1 of the ring wing has a different camber than the lower segment 107-2. The chord length and camber transition from that illustrated along the upper segment 107-1 to the lower segment 107-2. In implementations that include one or more stabilizer fins, such as stabilizer fin 120, the difference between the chord lengths of the lower segment 107-2 and the upper segment 107-1 may be less and/or the difference between the cambers of the lower segment 107-2 and the upper segment 107-1 may be less.

While the side segments, such as side segment 107-4 and segment 107-6 of the ring wing provide some lift, at the midpoint where side segments 107-4 and 107-6 meet, there is minimal lift produced by the ring wing 107. Because there is minimal lift produced at the midpoint, the segments may be tapered to reduce the overall weight of the aerial vehicle. In this example, the side segments, such as side segments 107-4 and 107-6, are tapered toward the mid-point but retain some dimension for structural integrity and to operate as a protective barrier around the propulsion mechanisms 102. While the illustrated example shows both side segments 107-4 and 107-6 tapering to a smaller end at the midpoint, in other implementations, the taper may be consistent from the larger top segment 107-1 to the smaller lower segment 107-2.

In addition to providing lift, the ring wing 107 provides a protective barrier or shroud that surrounds the propulsion mechanisms of the aerial vehicle 100. The protective barrier of the ring wing 107 increases the safety of the aerial vehicle. For example, if the aerial vehicle comes into contact with another object, there is a higher probability that the object will contact the ring wing, rather than a propulsion mechanism.

As discussed above, when the aerial vehicle is oriented for horizontal flight, as illustrated in FIG. 2, the fuselage 110 is oriented in the direction of travel, the ring wing 107 is oriented in the direction of travel such that it will produce a lifting force, and propulsion mechanisms 102-2 and 102-5, which are on opposing sides of the fuselage 110, are aligned to produce forces in the substantially horizontal direction to propel or thrust the aerial vehicle horizontally. The other propulsion mechanisms 102-1, 102-3, 102-4, and 102-6 are offset and may be disabled, used to produce maneuverability forces, and/or allowed to freely rotate and produce energy that is used to charge a power module of the aerial vehicle 100. By increasing the thrust produced by each of the propulsion mechanisms 102-2 and 102-5, the horizontal speed of the aerial vehicle increases. Likewise, the lifting force from the ring wing 107 also increases. In some implementations, one or more ailerons, such as those discussed above, may be included on the surface of the ring wing and used to control the aerial navigation of the aerial vehicle during horizontal flight. Likewise, one or more stabilizer fins 120 may be included to stabilize the aerial vehicle during horizontal flight.

In some implementations, the hexagonal shaped ring wing may decrease manufacturing costs, provide for more stable flight, and provide flatter surfaces upon which control elements, such as ailerons, may be included, in comparison to a ring wing having a substantially circular shape or various other shapes. Likewise, other components may be coupled to the surface of the ring wing. Other components may include, but are not limited to, sensors, imaging devices or elements, range finders, identifying markers, navigation components, such as global positioning satellite antennas, antennas, etc.

As discussed herein, to transition the aerial vehicle from a VTOL orientation to a horizontal flight orientation, as illustrated in FIG. 2, forces generated by each of the propulsion mechanisms 102 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed herein, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 102 are utilized to maintain flight of the aerial vehicle 100.

As illustrated in FIG. 2, each of the propulsion mechanisms 102 are positioned in approximately the same plane that is substantially aligned with the ring wing. Likewise, each propulsion mechanism 102 is spaced approximately sixty degrees from each other around the fuselage 110, such that the propulsion mechanisms are positioned at approximately equal distances with respect to one another and around the fuselage 110 of the aerial vehicle 100. For example, the second propulsion mechanism 102-2 and the fifth propulsion mechanism 102-5 may each be positioned along the X axis. The third propulsion mechanism 102-3 may be positioned at approximately sixty degrees from the X axis and the fourth propulsion mechanism 102-4 may be positioned approximately one-hundred and twenty degrees from the X axis. Likewise, the first propulsion mechanism 102-1 and the sixth propulsion mechanism 102-6 may likewise be positioned approximately sixty and one-hundred and twenty degrees from the X axis in the negative direction.

In other implementations, the spacing between the propulsion mechanisms may be different. For example, propulsion mechanisms 102-1, 102-3, and 102-5, which are oriented in the first direction, may each be approximately equally spaced 120 degrees apart and propulsion mechanisms 102-2, 102-4, and 102-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 102-1, 102-3, and 102-5, oriented in the first direction, may be positioned at approximately zero degrees, approximately 120 degrees, and approximately 240 degrees around the perimeter of the aerial vehicle with respect to the X axis, and the propulsion mechanisms 102-2, 102-4, and 102-6, oriented in the second direction, may be positioned at approximately 10 degrees, approximately 130 degrees, and approximately 250 degrees around the perimeter of the aerial vehicle 100 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIG. 2 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 102-1, 102-3, and 102-5 may each be oriented approximately fifteen degrees in the first direction and propulsion mechanisms 102-2, 102-4, and 102-6 may be oriented approximately twenty-five degrees in the second direction. In still other examples, pairs of propulsion mechanisms may have different orientations than other pairs of propulsion mechanisms. For example, propulsion mechanisms 102-1 and 102-6 may each be oriented approximately thirty degrees in the first direction and second direction, respectively, toward one another, propulsion mechanisms 102-3 and 102-2 may each be oriented approximately forty-five degrees in the first direction and second direction, respectively, toward one another, and propulsion mechanisms 102-5 and 102-4 may each be oriented approximately forty-five degrees in the first direction and second direction, respectively, toward one another.

As discussed herein, by orienting propulsion mechanisms partially toward one another in pairs, as illustrated, the lateral or horizontal forces generated by the pairs of propulsion mechanisms, when producing the same amount of force, may substantially cancel out such that the sum of the forces from the pair is only in a substantially vertical direction (Z direction), when the aerial vehicle is in the VTOL orientation. Likewise, as discussed below, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 102 enables the aerial vehicle 100 to operate independently in any of the six degrees of freedom (surge, sway, heave, pitch, yaw, and roll). As a result, the stability and maneuverability of the aerial vehicle 100 is increased.

While the implementations described herein include six arms that extend radially from a central portion of the aerial vehicle and are coupled to the ring wing, in other implementations, there may be fewer or additional arms. For example, the aerial vehicle may include support arms that extend between the motor arms and provide additional support to the aerial vehicle. As another example, not all of the motor arms may extend to and couple with the ring wing.

While the examples discussed herein describe a ring wing having a substantially hexagonal shape, in other implementations, the ring wing may have other shapes. For example, the ring wing may be substantially circular, square, rectangular, pentagonal, octagonal, etc. Further, while the examples discussed herein include six propulsion mechanism arms, six propulsion mechanisms, and six propellers, in other example embodiments, the systems and methods described herein may be implemented on various other types of aerial vehicles, such as aerial vehicles having fewer than six propulsion mechanism arms, motors, and propellers, aerial vehicles having greater than six propulsion mechanism arms, motors, and propellers, and/or aerial vehicles having configurations different from those described herein, such as quad-copters, octa-copters, or other configurations.

Figure 3:
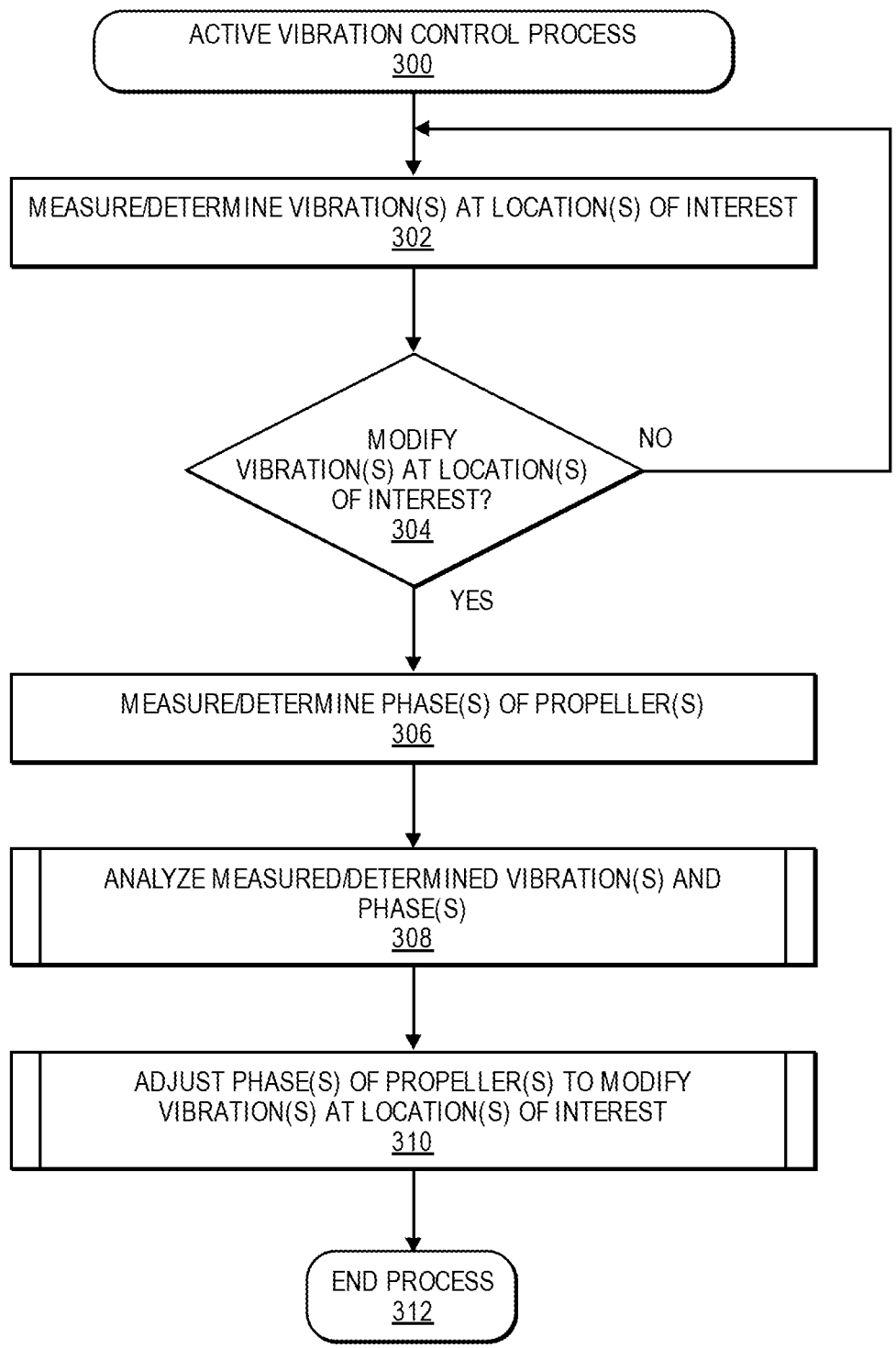
FIG. 3 is a flow diagram illustrating an example active vibration control process, in accordance with disclosed implementations.

FIG. 3 is a flow diagram illustrating an example active vibration control process 300, in accordance with disclosed implementations.

The process 300 may begin by measuring or determining one or more vibrations at one or more locations of interest, as at 302. For example, one or more vibrations or forces affecting all or a portion of an aerial vehicle may be measured or determined. In example embodiments, various types of sensors may be used to measure or detect vibrations or forces affecting all or a portion of the aerial vehicle, such as inertial measurement units, micro-electro-mechanical systems (MEMS) inertial measurement units, accelerometers, gyroscopes, magnetometers, or other types of sensors. One or more of these sensors may be placed at various locations on the aerial vehicle, such as within the fuselage 110, as part of the aerial vehicle control system 114, on one or more motor arms 105, on one or more motors 101, on one or more stabilizer fins 120, on one or more wing sections 107, or associated with various other locations on the aerial vehicle. Further, one or more of these sensors may be placed at joints or couplings, on various structural components, on a payload, or on one or more sensors, avionics components, motors, actuators, processors, controllers, or other electronic components on the aerial vehicle.

The process 300 may continue by determining whether to modify one or more vibrations at one or more locations of interest, as at 304. In example embodiments, the measured or determined vibrations or forces at one or more locations of interest may be compared with target or threshold values or ranges of vibrations or forces, and if the measured or determined vibrations or forces are outside a target range or above or below a threshold value, it may be determined to modify one or more vibrations or forces at one or more locations of interest. For example, vibrations or forces affecting an aerial vehicle as a whole may be reduced, induced, or modified to be within a target range or above or below a threshold value. In addition, vibrations or forces affecting a particular location of interest may be reduced, induced, or modified to be within a target range or above or below a threshold value.

If it is determined that one or more vibrations at one or more locations of interest are not to be modified, as at 304, then the process 300 may return to step 302 and continue to measure or determine one or more vibrations at one or more locations of interest.

If, however, it is determined that one or more vibrations at one or more locations of interest are to be modified, as at 304, then the process 300 may proceed to measure or determine one or more phases of one or more propellers, as at 306. For example, one or more phases of one or more propellers may be measured or determined by one or more state estimators associated with respective motor controllers of respective motors that rotate the one or more propellers. In example embodiments utilizing brushless motors to rotate the one or more propellers, the one or more state estimators associated with respective motor controllers may utilize propeller phase information or data in order to control the rotational direction, rotational speed, and/or other characteristics of the respective motor and propeller. Thus, the phases of one or more propellers may be determined based on propeller phase information or data utilized by the one or more state estimators.

In other example embodiments utilizing brushed motors to rotate the one or more propellers and/or motor controllers that do not include state estimators as described herein, various types of sensors may be used to measure or detect phases of one or more propellers, such as resolvers, encoders of various types, Hall effect sensors, or other types of sensors to measure or detect propeller phase information or data. In this manner, the phases of one or more propellers may be determined based on propeller phase information or data measured or detected by various types of sensors.

The process 300 may then continue to analyze the measured or determined one or more vibrations and phases of one or more propellers, as at 308. As described in further detail herein, in example embodiments, the measured or determined vibrations and phases may be analyzed with reference to defined models, lookup tables, and/or stored information related to vibrations and phases of one or more propellers to determine adjustments to one or more phases of one or more propellers to modify the vibrations. In other example embodiments, the measured or determined vibrations and phases may be analyzed with reference to adaptive control models to determine adjustments to one or more phases of one or more propellers to modify the vibrations.

The process 300 may then proceed by adjusting phases of one or more propellers to modify one or more vibrations at one or more locations of interest, as at 310. As described in further detail herein, in example embodiments, phases of one or more propellers may be adjusted by modifying the rotational rates of respective motors rotating the one or more propellers. In other example embodiments, phases of one or more propellers may be adjusted by modifying drag experienced by the one or more propellers. In further example embodiments, phases of one or more propellers may be adjusted by actuating one or more control surfaces of the one or more propellers.

By adjusting phases of one or more propellers as described herein, vibrations or forces affecting all or a portion of an aerial vehicle may be reduced, induced, or modified. In addition, the vibrations or forces may be modified to be within a target range or above or below a threshold value. The process 300 may then end, as at 312. Further, the process 300 may be repeated as desired to monitor and modify vibrations affecting all or a portion of an aerial vehicle, such as during particular portions of a flight plan, in particular geographic areas or locations, during particular aerial vehicle operations, within particular types of environments, or based on other factors.

Figure 4:
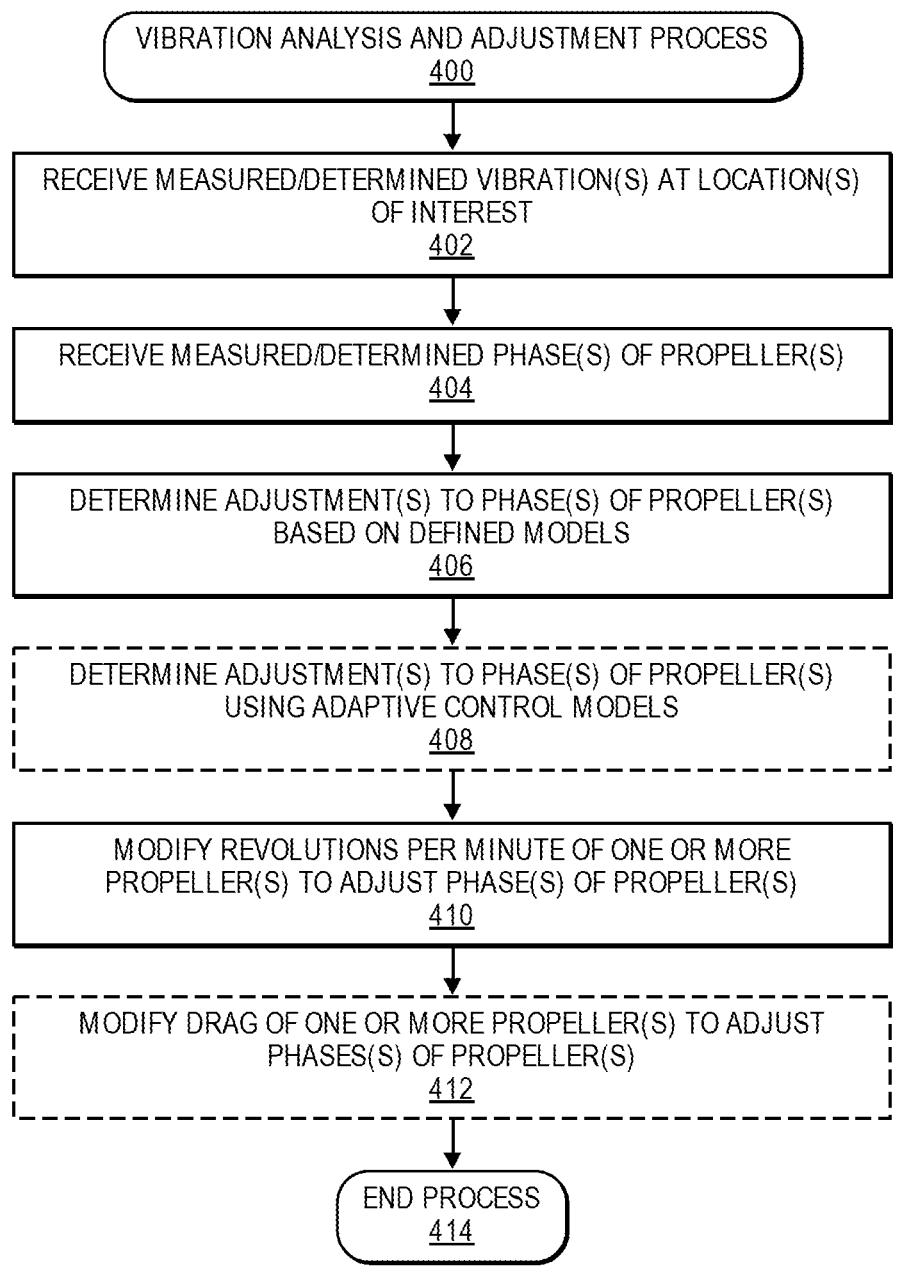
FIG. 4 is a flow diagram illustrating an example vibration analysis and adjustment process, in accordance with disclosed implementations.

FIG. 4 is a flow diagram illustrating an example vibration analysis and adjustment process 400, in accordance with disclosed implementations. For example, FIG. 4 illustrates further details related to steps 308 and 310 described herein with respect to FIG. 3.

The process 400 may begin by receiving measured or determined one or more vibrations at one or more locations of interest, as at 402. As described herein, the one or more vibrations may be measured or determined using various types of sensors at various locations of an aerial vehicle.

The process 400 may continue by receiving measured or determined one or more phases of one or more propellers, as at 404. As described herein, the phases of one or more propellers may be measured or determined using state estimators or various types of sensors associated with motors and/or motor controllers of an aerial vehicle.

The process 400 may then proceed to determine one or more adjustments to one or more phases of one or more propellers based on defined models, as at 406. For example, the measured or determined vibrations and phases may be analyzed with reference to defined models, lookup tables, and/or stored information related to vibrations and phases of one or more propellers to determine adjustments to one or more phases of one or more propellers to modify the vibrations. The defined models may comprise one or more models of an aerial vehicle that may be analyzed to determine or compute phases or phase relationships of one or more propellers and corresponding or resulting vibrations or forces at one or more locations of interest on the aerial vehicle. In addition, the determined or computed phases or phase relationships and corresponding vibrations may be stored in lookup tables or other types of data storage.

In example embodiments, in order to determine adjustments to phases of one or more propellers using defined models, lookup tables, and/or stored information, the measured or determined vibrations and phases received at steps 402 and 404 may be correlated to the defined models, lookup tables, and/or stored information. Then, based on the desired modification to the vibrations or forces affecting all or a portion of the aerial vehicle, adjustments to phases of one or more propellers may be identified to effect the desired modification to vibrations or forces. Further, although the defined models, lookup tables, and/or stored information may include many possible sets or groups of adjustments to phases of one or more propellers to effect the desired modification to vibrations or forces, a set or group of adjustments to phases of one or more propellers may be selected that may include the fewest number and/or magnitude of changes to phases of one or more propellers, such that operations of the aerial vehicle are minimally or negligibly impacted.

In other example embodiments, the process 400 may additionally (or alternatively to step 406) proceed to determine one or more adjustments to one or more phases of one or more propellers using adaptive control models, as at 408. For example, the measured or determined vibrations and phases may be analyzed using various types of adaptive control models or mimetic control models to determine adjustments to one or more phases of one or more propellers to modify the vibrations. The adaptive control models may comprise one or more models of an aerial vehicle that may be analyzed to determine or compute phases or phase relationships of one or more propellers and corresponding or resulting vibrations or forces at one or more locations of interest on the aerial vehicle during operations of the aerial vehicle, generally without prior computation or analysis of such data or similar data.

In example embodiments, in order to determine adjustments to phases of one or more propellers using adaptive control models, the measured or determined vibrations and phases received at steps 402 and 404 may be provided to the adaptive control models. Then, based on the desired modification to the vibrations or forces affecting all or a portion of the aerial vehicle, adjustments to phases of one or more propellers may be determined or computed by the adaptive control models to effect the desired modification to vibrations or forces.

The process 400 may then continue by modifying the rotational rates of one or more propellers to adjust phases of the one or more propellers, as at 410. For example, in order to adjust the phase of a propeller, a motor controller and/or motor may increase, decrease, or otherwise modify the rotational rate of the respective motor and propeller to effect a change to the phase of the propeller. The rotational rate of the propeller may be temporarily increased or decreased to adjust the phase of the propeller, and upon completing the desired phase change to the propeller, the rotational rate of the propeller may be returned to the value prior to the adjustment or modified to another value to maintain the current phase or phase relationship with other propellers. In addition, the rotational rates of two or more propellers may be temporarily increased or decreased to adjust phases of the propellers, and upon completing the desired phase changes to the propellers, the rotational rates of one or more of the propellers may be returned to values prior to the adjustments or modified to other values to maintain the current phases or phase relationships between two or more propellers.

In other example embodiments, the process 400 may additionally (or alternatively to step 410) proceed by modifying drag of one or more propellers to adjust phases of the one or more propellers, as at 412. For example, in order to adjust the phase of a propeller, a trim tab, an aileron, a control surface, or other portion of the propeller may be adjusted or modified to increase, decrease, or otherwise modify drag experienced by the propeller to effect a change to the phase of the propeller. The drag experienced by the propeller may be temporarily increased or decreased to adjust the phase of the propeller, and upon completing the desired phase change to the propeller, the drag experienced by the propeller may be returned to the value prior to the adjustment or modified to another value to maintain the current phase or phase relationship with other propellers. In addition, the drag experienced by two or more propellers may be temporarily increased or decreased to adjust phases of the propellers, and upon completing the desired phase changes to the propellers, the drag experienced by one or more of the propellers may be returned to values prior to the adjustments or modified to other values to maintain the current phases or phase relationships between two or more propellers.

By adjusting phases of one or more propellers as described herein, vibrations or forces affecting all or a portion of an aerial vehicle may be reduced, induced, or modified. In addition, the vibrations or forces may be modified to be within a target range or above or below a threshold value. The process 400 may then end, as at 414. Further, the process 400 may be repeated as desired to monitor and modify vibrations affecting all or a portion of an aerial vehicle, such as during particular portions of a flight plan, in particular geographic areas or locations, during particular aerial vehicle operations, within particular types of environments, or based on other factors.

Figure 5:
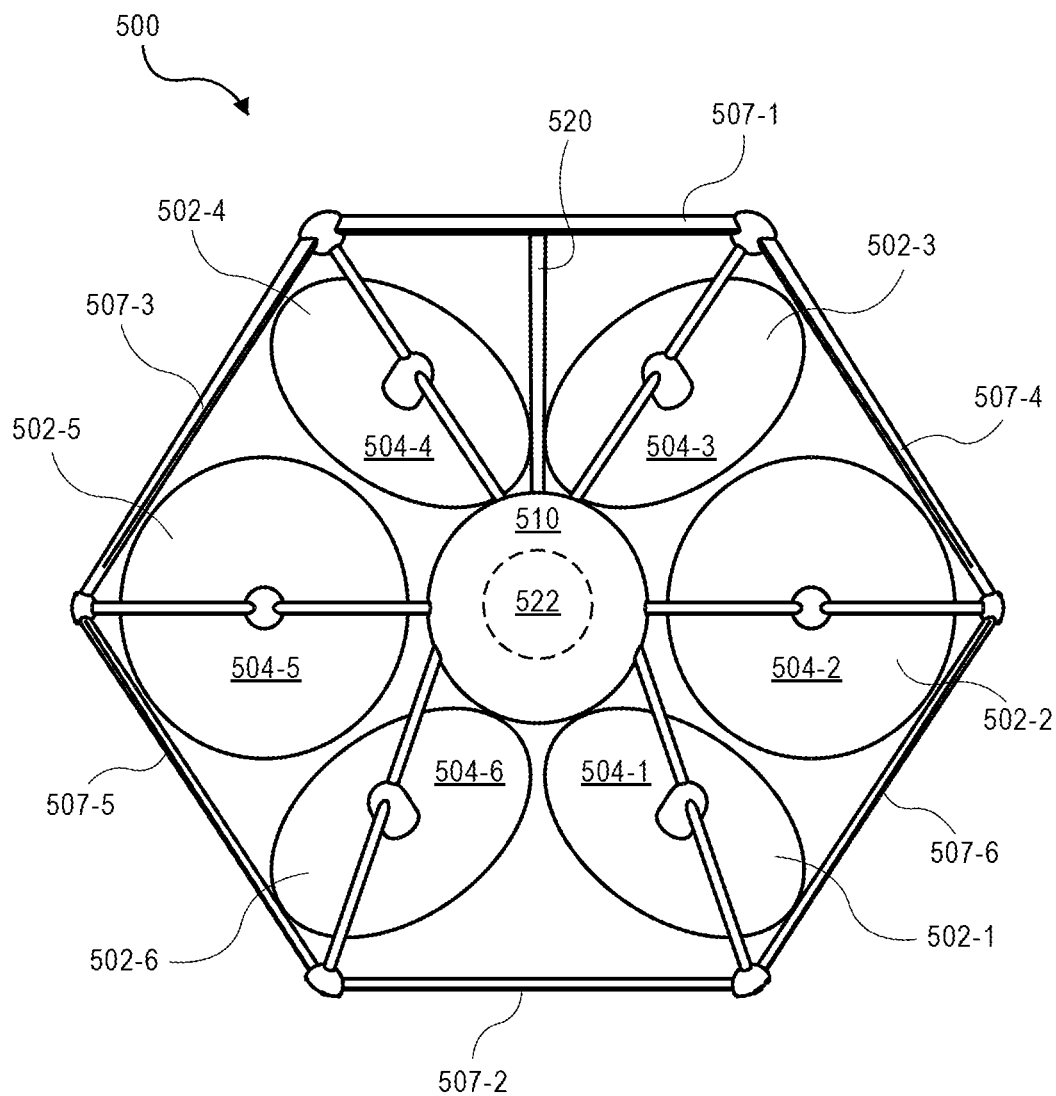
FIG. 5 illustrates a front view of an aerial vehicle with a substantially hexagonal shaped ring wing and a sensor at a location of interest, in accordance with disclosed implementations.

FIG. 5 illustrates a front view of an aerial vehicle 500 with a substantially hexagonal shaped ring wing 507 and a sensor 522 at a location of interest, in accordance with disclosed implementations.

As described herein in further detail, the aerial vehicle 500 may include six propulsion mechanisms 502-1, 502-2, 502-3, 502-4, 502-5, 502-6, each propulsion mechanism 502 including a respective motor and corresponding propeller 504-1, 504-2, 504-3, 504-4, 504-5, 504-6. Each of the propulsion mechanisms 502 may be coupled to a respective motor arm, and the six motor arms may be coupled to and extend from a fuselage 510. In addition, a ring wing 507 including wing sections 507-1, 507-2, 507-3, 507-4, 507-5, 507-6 may be coupled to ends of the six motor arms and encompass or surround the six propulsion mechanisms 502 and the fuselage 510. Further, a stabilizer fin 520 may also be coupled between the fuselage 510 and the ring wing 507. Moreover, the aerial vehicle 500 may include any and all of the various features, components, or elements described herein with respect to aerial vehicle 100 illustrated in FIGS. 1A, 1B, and 2.

As shown in FIG. 5, the aerial vehicle 500 may also include a sensor 522 positioned at a location of interest. For example, the sensor 522 may comprise various types of sensors, such as imaging devices, visual sensors, time of flight sensors, audio sensors, inertial measurement units, accelerometers, gyroscopes, navigation sensors, or other types of sensors. In addition, the sensor 522 may be positioned within the fuselage 510 of the aerial vehicle 500.

In some example embodiments, the sensor 522 may comprise an imaging device having a field of view pointing downward toward the ground during VTOL flight of the aerial vehicle. During aerial vehicle operations such as takeoff, landing, payload delivery, or other operations that may utilize imaging data from such an imaging device, vibrations or forces affecting the fuselage of the aerial vehicle may be reduced or minimized by adjustments to phases of one or more propellers, such that the imaging device is able to capture clear and focused imaging data during such operations.

In other example embodiments, the sensor 522 may comprise a navigation sensor. During aerial vehicle operations that may require relatively precise location determination, such as payload pickup, payload delivery, or other operations, vibrations or forces affecting the fuselage of the aerial vehicle may be reduced or minimized by adjustments to phases of one or more propellers, such that the navigation sensor is able to receive or determine location information with a high degree of accuracy during such operations.

Although FIG. 5 illustrates a single sensor at a particular location, the aerial vehicle 500 may include any other number, combination, or arrangement of various types of sensors at various locations of the aerial vehicle. Further, vibrations and forces affecting one or more of the sensors may be monitored and modified as desired using the systems and methods described herein, such as during particular portions of a flight plan, in particular geographic areas or locations, during particular aerial vehicle operations, within particular types of environments, or based on other factors.

Figure 6:
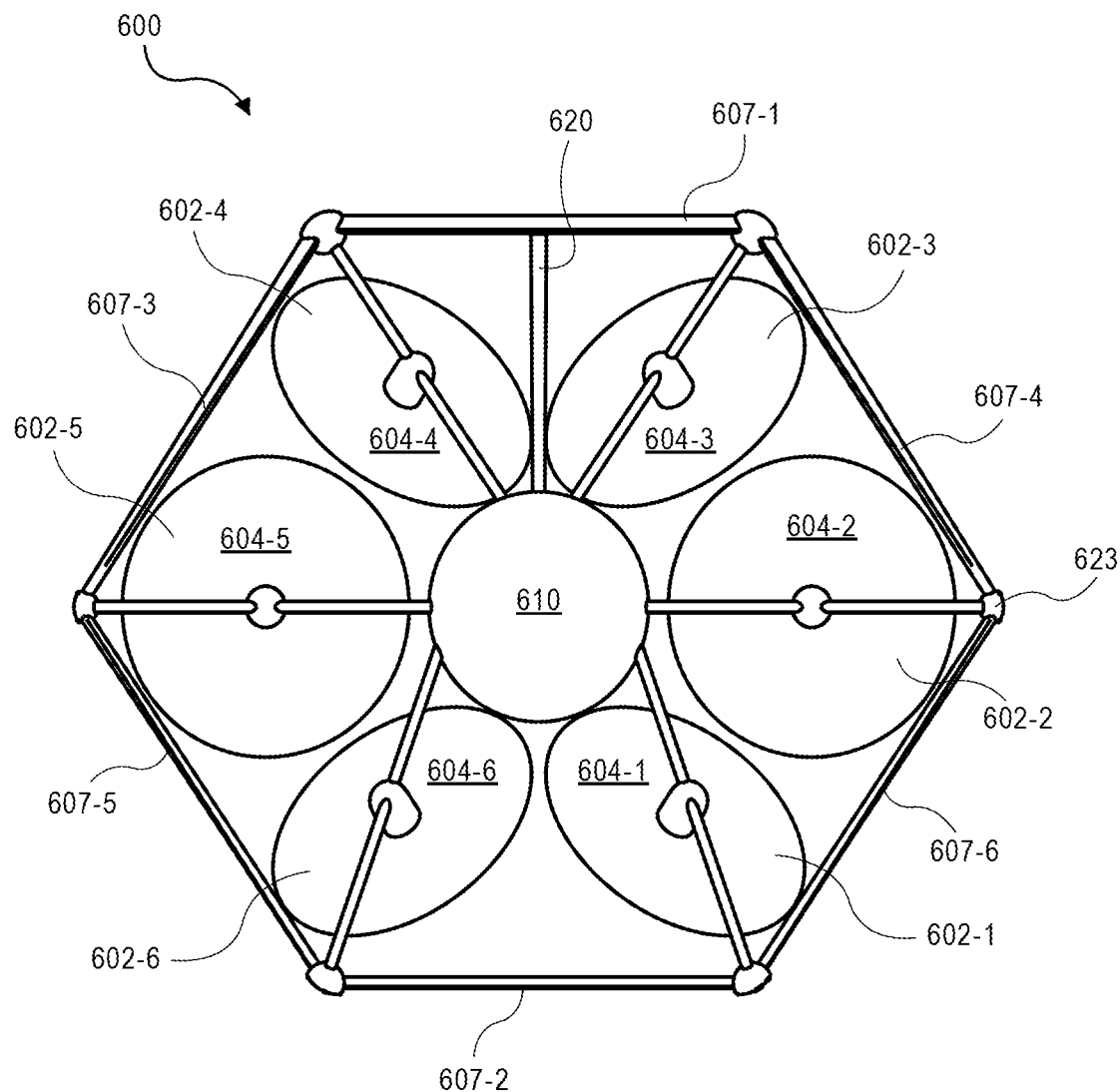
FIG. 6 illustrates a front view of an aerial vehicle with a substantially hexagonal shaped ring wing and at least one location of interest, in accordance with disclosed implementations.

FIG. 6 illustrates a front view of an aerial vehicle 600 with a substantially hexagonal shaped ring wing 607 and at least one location of interest 623, in accordance with disclosed implementations.

As described herein in further detail, the aerial vehicle 600 may include six propulsion mechanisms 602-1, 602-2, 602-3, 602-4, 602-5, 602-6, each propulsion mechanism 602 including a respective motor and corresponding propeller 604-1, 604-2, 604-3, 604-4, 604-5, 604-6. Each of the propulsion mechanisms 602 may be coupled to a respective motor arm, and the six motor arms may be coupled to and extend from a fuselage 610. In addition, a ring wing 607 including wing sections 607-1, 607-2, 607-3, 607-4, 607-5, 607-6 may be coupled to ends of the six motor arms and encompass or surround the six propulsion mechanisms 602 and the fuselage 610. Further, a stabilizer fin 620 may also be coupled between the fuselage 610 and the ring wing 607. Moreover, the aerial vehicle 600 may include any and all of the various features, components, or elements described herein with respect to aerial vehicle 100 illustrated in FIGS. 1A, 1B, and 2, and the aerial vehicle 500 illustrated in FIG. 5.

As shown in FIG. 6, the aerial vehicle 600 may also include a location of interest 623. The location of interest 623 may comprise a structural component or element, a joint or coupling, a sensor, avionics component, motor, actuator, processor, controller, or other electronic component, or any other component or portion of the aerial vehicle that may be affected by vibrations or forces.

In some example embodiments, the location of interest 623 may comprise structural damage or compromise to a portion of the aerial vehicle, such as a structural component, joint, or coupling. The structural damage may be detected by various types of sensors, such as strain gauges or other surface sensors associated with the location of interest 623, imaging devices that may capture imaging data of the location of interest 623, avionics components that may detect abnormal operations of the aerial vehicle resulting from the structural damage at the location of interest 623, or other types of sensors. During aerial vehicle operations, vibrations or forces affecting the structural damage at the location of interest 623 of the aerial vehicle may be reduced or minimized by adjustments to phases of one or more propellers, such that further structural damage may be prevented or slowed, and the aerial vehicle may be able to identify and land at a safe landing location for maintenance or repairs.

In other example embodiments, the location of interest 623 may comprise a portion of the ring wing, the fuselage, a motor arm, a motor, or other structural component. In addition, one or more sensors may be associated with the location of interest 623 to detect debris, precipitation, ice, or other foreign materials at the location of interest 623, such as visual sensors, temperature sensors, humidity or precipitation sensors, pressure sensors, or other types of sensors. During aerial vehicle operations, vibrations or forces affecting the location of interest 623 of the aerial vehicle may be induced or increased by adjustments to phases of one or more propellers, such that the debris or foreign materials may be removed from the location of interest 623, and the aerial vehicle may be able to continue safe operation following such removal.

Although FIG. 6 illustrates a single location of interest on the aerial vehicle, the aerial vehicle 600 may include any other number, combination, or arrangement of various locations of interest on the aerial vehicle. Further, vibrations and forces affecting one or more of the locations of interest may be monitored and modified as desired using the systems and methods described herein, such as during particular portions of a flight plan, in particular geographic areas or locations, during particular aerial vehicle operations, within particular types of environments, or based on other factors.

Figure 7:
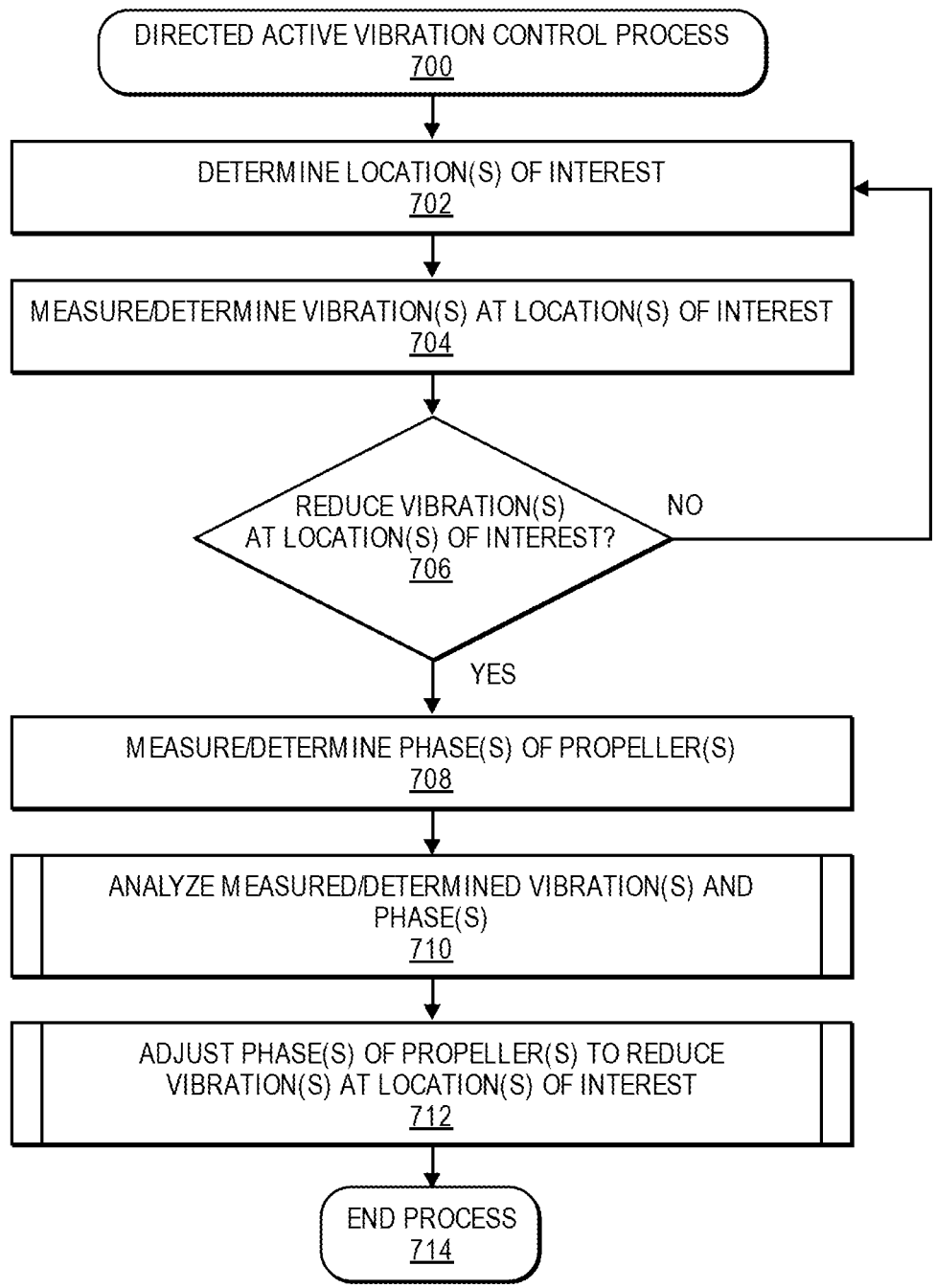
FIG. 7 is a flow diagram illustrating an example directed active vibration control process, in accordance with disclosed implementations.

FIG. 7 is a flow diagram illustrating an example directed active vibration control process 700, in accordance with disclosed implementations.

The process 700 may begin by determining one or more locations of interest, as at 702. As described herein, a location of interest may comprise a structural component or element of an aerial vehicle. In addition, a location of interest may comprise a joint or coupling of an aerial vehicle. Further, a location of interest may comprise a sensor, avionics component, motor, actuator, processor, controller, or other electronic component of an aerial vehicle. Moreover, the location of interest may be identified using one or more sensors to detect abnormalities or changes to one or more components or portions of an aerial vehicle. Still further, the location of interest may be identified based on a particular or current portion of a flight plan, a particular or current geographic area or location, a particular or current aerial vehicle operation, a particular or current environment, or based on other factors.

The process 700 may continue by measuring or determining one or more vibrations at one or more locations of interest, as at 704. For example, one or more vibrations or forces affecting a location of interest of an aerial vehicle may be measured or determined. In example embodiments, various types of sensors may be used to measure or detect vibrations or forces affecting a location of interest of the aerial vehicle, such as inertial measurement units, micro-electro-mechanical systems (MEMS) inertial measurement units, accelerometers, gyroscopes, magnetometers, or other types of sensors. One or more of these sensors may be placed at various locations of interest on the aerial vehicle, such as within the fuselage, as part of the aerial vehicle control system, on one or more motor arms, on one or more motors, on one or more stabilizer fins, on one or more wing sections, or associated with various other locations of interest on the aerial vehicle. Further, one or more of these sensors may be placed at joints or couplings, on various structural components, on a payload, or on one or more sensors, avionics components, motors, actuators, processors, controllers, or other electronic components on the aerial vehicle.

The process 700 may continue by determining whether to reduce one or more vibrations at one or more locations of interest, as at 706. In example embodiments, the measured or determined vibrations or forces at one or more locations of interest may be compared with target or threshold values of vibrations or forces, and if the measured or determined vibrations or forces are outside a target range or above a threshold value, it may be determined to reduce one or more vibrations or forces at one or more locations of interest. In other example embodiments, the measured or determined vibrations or forces may be minimized, induced, increased, or otherwise modified relative to a target range or a threshold value. For example, vibrations or forces affecting a particular location of interest may be reduced, induced, or modified to be within a target range or above or below a threshold value.

If it is determined that one or more vibrations at one or more locations of interest are not to be modified, as at 706, then the process 700 may return to step 702 and continue to determine one or more locations of interest, and measure or determine one or more vibrations at one or more locations of interest.

If, however, it is determined that one or more vibrations at one or more locations of interest are to be reduced, as at 706, then the process 700 may proceed to measure or determine one or more phases of one or more propellers, as at 708. For example, one or more phases of one or more propellers may be measured or determined by one or more state estimators associated with respective motor controllers of respective motors that rotate the one or more propellers. In example embodiments utilizing brushless motors to rotate the one or more propellers, the one or more state estimators associated with respective motor controllers may utilize propeller phase information or data in order to control the rotational direction, rotational speed, and/or other characteristics of the respective motor and propeller. Thus, the phases of one or more propellers may be determined based on propeller phase information or data utilized by the one or more state estimators.

In other example embodiments utilizing brushed motors to rotate the one or more propellers and/or motor controllers that do not include state estimators as described herein, various types of sensors may be used to measure or detect phases of one or more propellers, such as resolvers, encoders of various types, Hall effect sensors, or other types of sensors to measure or detect propeller phase information or data. In this manner, the phases of one or more propellers may be determined based on propeller phase information or data measured or detected by various types of sensors.

The process 700 may then continue to analyze the measured or determined one or more vibrations and phases of one or more propellers, as at 710. As described in further detail herein, in example embodiments, the measured or determined vibrations and phases may be analyzed with reference to defined models, lookup tables, and/or stored information related to vibrations and phases of one or more propellers to determine adjustments to one or more phases of one or more propellers to modify the vibrations at one or more locations of interest. In other example embodiments, the measured or determined vibrations and phases may be analyzed with reference to adaptive control models to determine adjustments to one or more phases of one or more propellers to modify the vibrations at one or more locations of interest.

The process 700 may then proceed by adjusting phases of one or more propellers to reduce one or more vibrations at one or more locations of interest, as at 712. As described in further detail herein, in example embodiments, phases of one or more propellers may be adjusted by modifying the rotational rates of respective motors rotating the one or more propellers. In other example embodiments, phases of one or more propellers may be adjusted by modifying drag experienced by the one or more propellers. In further example embodiments, phases of one or more propellers may be adjusted by actuating one or more control surfaces of the one or more propellers.

By adjusting phases of one or more propellers as described herein, vibrations or forces affecting one or more locations of interest of an aerial vehicle may be reduced, induced, or modified. In addition, the vibrations or forces may be modified to be within a target range or above or below a threshold value. The process 700 may then end, as at 714. Further, the process 700 may be repeated as desired to monitor and modify vibrations affecting one or more locations of interest of an aerial vehicle, such as during particular portions of a flight plan, in particular geographic areas or locations, during particular aerial vehicle operations, within particular types of environments, or based on other factors.

Figure 8:
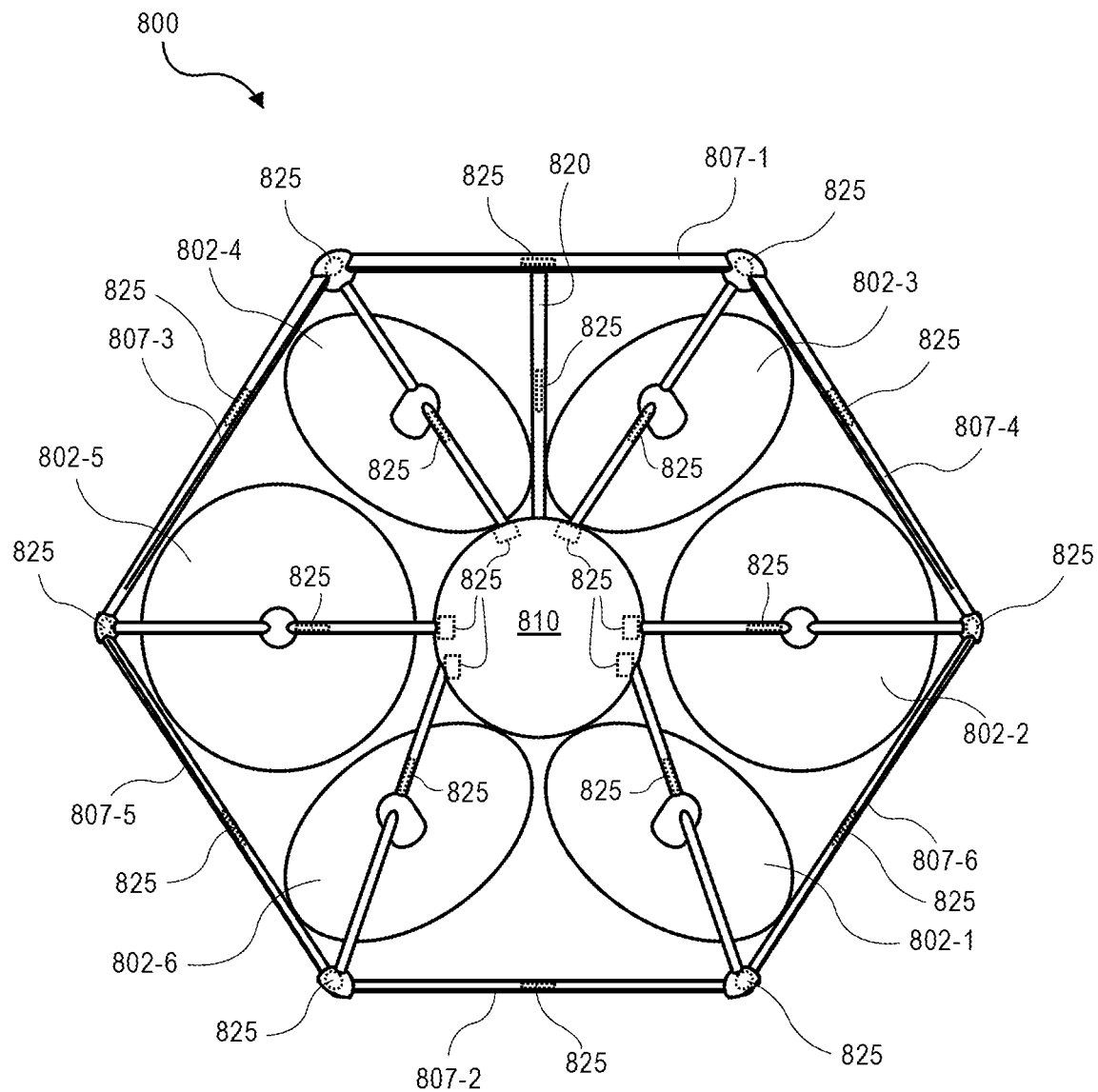
FIG. 8 illustrates a front view of an aerial vehicle with a substantially hexagonal shaped ring wing and a plurality of sensors, in accordance with disclosed implementations.

FIG. 8 illustrates a front view of an aerial vehicle 800 with a substantially hexagonal shaped ring wing 807 and a plurality of sensors 825, in accordance with disclosed implementations.

As described herein in further detail, the aerial vehicle 800 may include six propulsion mechanisms 802-1, 802-2, 802-3, 802-4, 802-5, 802-6, each propulsion mechanism 802 including a respective motor and corresponding propeller. Each of the propulsion mechanisms 802 may be coupled to a respective motor arm, and the six motor arms may be coupled to and extend from a fuselage 810. In addition, a ring wing 807 including wing sections 807-1, 807-2, 807-3, 807-4, 807-5, 807-6 may be coupled to ends of the six motor arms and encompass or surround the six propulsion mechanisms 802 and the fuselage 810. Further, a stabilizer fin 820 may also be coupled between the fuselage 810 and the ring wing 807. Moreover, the aerial vehicle 800 may include any and all of the various features, components, or elements described herein with respect to aerial vehicle 100 illustrated in FIGS. 1A, 1B, and 2, the aerial vehicle 500 illustrated in FIG. 5, and the aerial vehicle 600 illustrated in FIG. 6.

As shown in FIG. 8, the aerial vehicle 800 may also include a plurality of sensors 825 at various locations on the aerial vehicle 800. The plurality of sensors 825 may comprise various types of sensors that may be used to measure or detect vibrations or forces affecting a location of interest of the aerial vehicle, such as inertial measurement units, micro-electro-mechanical systems (MEMS) inertial measurement units, accelerometers, gyroscopes, magnetometers, or other types of sensors. One or more of these sensors may be placed at various locations of interest on the aerial vehicle, such as within the fuselage, as part of the aerial vehicle control system, on one or more motor arms, on one or more motors, on one or more stabilizer fins, on one or more wing sections, or associated with various other locations of interest on the aerial vehicle. Further, one or more of these sensors may be placed at joints or couplings, on various structural components, on a payload, or on one or more sensors, avionics components, motors, actuators, processors, controllers, or other electronic components on the aerial vehicle.

In some example embodiments, each of the plurality of sensors 825 may allow measurement and determination of vibrations and forces affecting a location of interest proximate a location of each respective sensor 825. In this manner, vibrations and forces affecting a location of interest proximate a respective sensor 825 may be measured or determined, and phases of one or more propellers may be adjusted to reduce, minimize, induce, increase, or otherwise modify vibrations or forces at the location of interest.

In other example embodiments, an aerial vehicle may be operated in various modes, such as VTOL flight, horizontal flight, transitions between VTOL and horizontal flight, or various other modes, and one or more of the plurality of sensors 825 may measure or detect vibrations and forces affecting locations of interest proximate each of the plurality of sensors 825 in order to validate operation of the aerial vehicle with respect to expected or nominal vibrations and forces at locations of interest based on defined models, lookup tables, or other stored information related to the aerial vehicle. For example, structural integrity of one or more components, joints, couplings, or elements of the aerial vehicle may be validated. In addition, acceptable vibrations and forces at various locations of interest, such as locations having sensors, controllers, or other electronics components, may also be validated.

Further, although locations of interest are generally described herein in relation to portions or sections of structure, components, or elements of an aerial vehicle, in some example embodiments, locations of interest may comprise entire components or systems of an aerial vehicle, such as an entire wing, an entire fuselage, control systems, navigation systems, or other systems of an aerial vehicle. In addition, data from a plurality of sensors associated with locations of interest comprising entire components or systems of an aerial vehicle may be processed collectively to validate such components or systems, or to determine faults or failures associated with such components or systems.

Although FIG. 8 illustrates a particular number, combination, or arrangement of a plurality of sensors 825 on the aerial vehicle, the aerial vehicle 800 may include any other number, combination, or arrangement of one or more sensors 825 on the aerial vehicle. Further, vibrations and forces affecting one or more of the locations of interest may be monitored and modified as desired using the systems and methods described herein, such as during particular portions of a flight plan, in particular geographic areas or locations, during particular aerial vehicle operations, within particular types of environments, or based on other factors.

Figure 9:
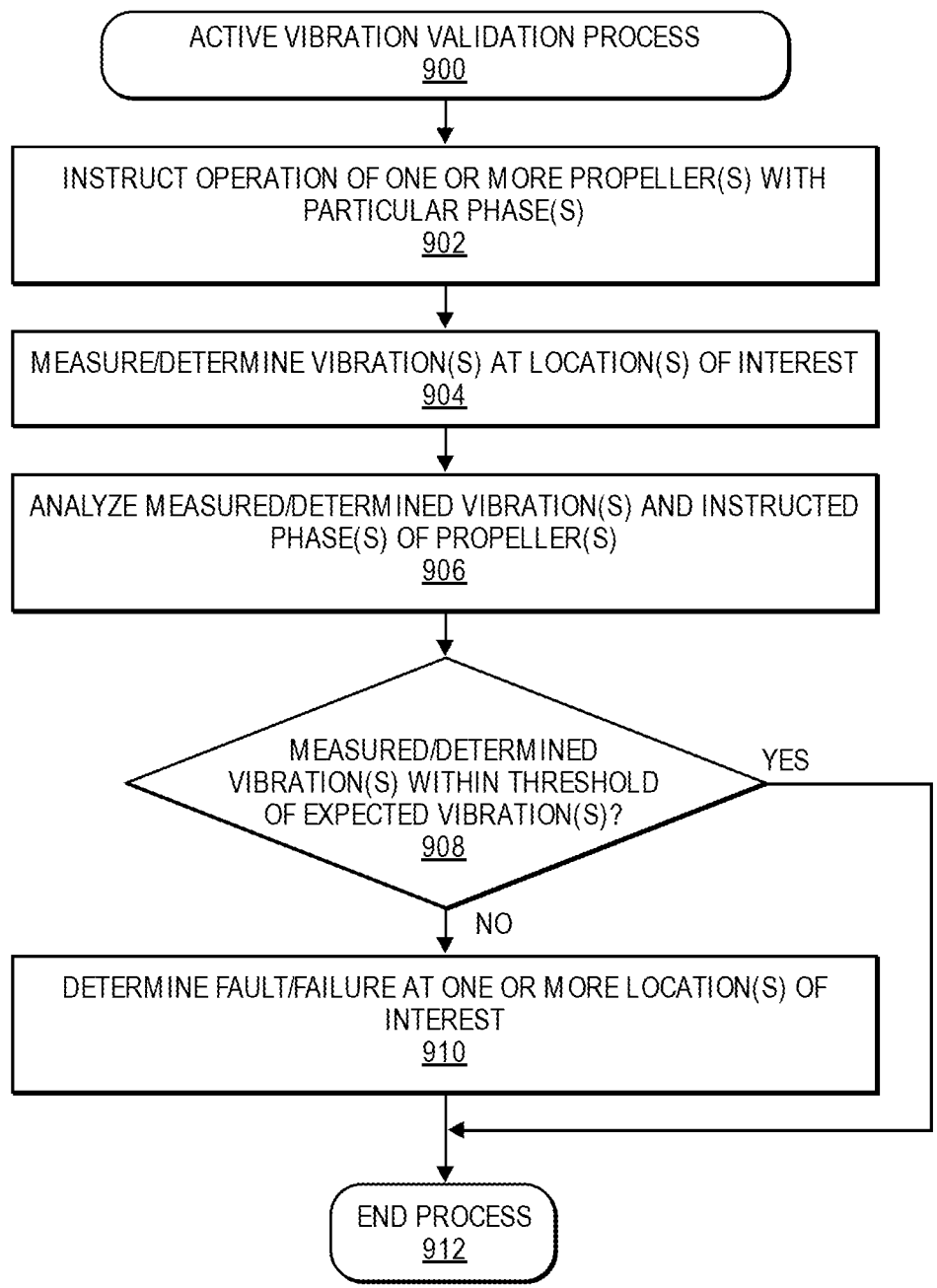
FIG. 9 is a flow diagram illustrating an example active vibration validation process, in accordance with disclosed implementations.

FIG. 9 is a flow diagram illustrating an example active vibration validation process 900, in accordance with disclosed implementations.

The process 900 may begin by instructing operation of one or more propellers with particular phases or phase relationships, as at 902. For example, an aerial vehicle may operate in a particular mode, and/or may operate various combinations of one or more propellers and respective motors with particular phases or phase relationships. The particular modes of operation and/or the various combinations of operation of propellers with particular phases may produce expected or nominal vibrations and forces at various locations of interest based on defined models, lookup tables, or stored information that have been previously computed and/or analyzed.

The process 900 may continue by measuring or determining one or more vibrations at one or more locations of interest, as at 904. For example, one or more vibrations or forces affecting one or more locations of interest of an aerial vehicle may be measured or determined. In example embodiments, various types of sensors may be used to measure or detect vibrations or forces affecting a location of interest of the aerial vehicle, such as inertial measurement units, micro-electro-mechanical systems (MEMS) inertial measurement units, accelerometers, gyroscopes, magnetometers, or other types of sensors. One or more of these sensors may be placed at various locations of interest on the aerial vehicle, such as within the fuselage, as part of the aerial vehicle control system, on one or more motor arms, on one or more motors, on one or more stabilizer fins, on one or more wing sections, or associated with various other locations of interest on the aerial vehicle. Further, one or more of these sensors may be placed at joints or couplings, on various structural components, on a payload, or on one or more sensors, avionics components, motors, actuators, processors, controllers, or other electronic components on the aerial vehicle.

The process 900 may then continue to analyze the measured or determined one or more vibrations and instructed phases of one or more propellers, as at 906. As described in further detail herein, in example embodiments, the measured or determined vibrations and instructed phases may be analyzed with reference to defined models, lookup tables, and/or stored information related to expected or nominal vibrations at locations of interest corresponding to instructed phases of one or more propellers.

The process 900 may then proceed to determine whether the measured or determined one or more vibrations are within a threshold value of expected or nominal vibrations, as at 908. For example, the measured or determined vibrations may be compared with expected or nominal vibrations at locations of interest to determine whether they fall within a target range or above or below a threshold value of such expected or nominal vibrations. If it is determined that the measured or determined vibrations do not fall within a target range or above or below a threshold value of the expected or nominal vibrations at locations of interest, as at 908, then it may be determined that the aerial vehicle, or a portion, component, or element of the aerial vehicle at the location of interest, has experienced a fault or failure, as at 910. As a result, the aerial vehicle may not operate properly and/or may be damaged, compromised, or otherwise degraded at the location of interest. In such cases, the aerial vehicle, or a portion thereof, may undergo maintenance or repairs to resolve such faults or failures.

If, however, it is determined that the measured or determined vibrations do fall within a target range or above or below a threshold value of the expected or nominal vibrations at locations of interest, as at 908, then it may be determined that the aerial vehicle, or a portion, component, or element of the aerial vehicle at the location of interest, is operating properly and/or is not damaged, compromised, or otherwise degraded. As a result, the aerial vehicle, or a portion thereof, may be validated for various aerial vehicle operations.

By instructing operation of one or more propellers with particular phases or phase relationships as described herein, vibrations or forces affecting one or more locations of interest of an aerial vehicle may be measured and analyzed with respect to expected or nominal vibrations or forces at such locations of interest of the aerial vehicle. In addition, the measured or determined vibrations or forces may be expected to fall within a target range or above or below a threshold value of expected or nominal vibrations or forces. The process 900 may then end, as at 912. Further, the process 900 may be repeated as desired with different modes of operation and/or different combinations of phases or phase relationships to validate an aerial vehicle, or portions thereof, for various aerial vehicle operations, such as during particular portions of a flight plan, in particular geographic areas or locations, during particular aerial vehicle operations, within particular types of environments, or based on other factors.

Figure 10:
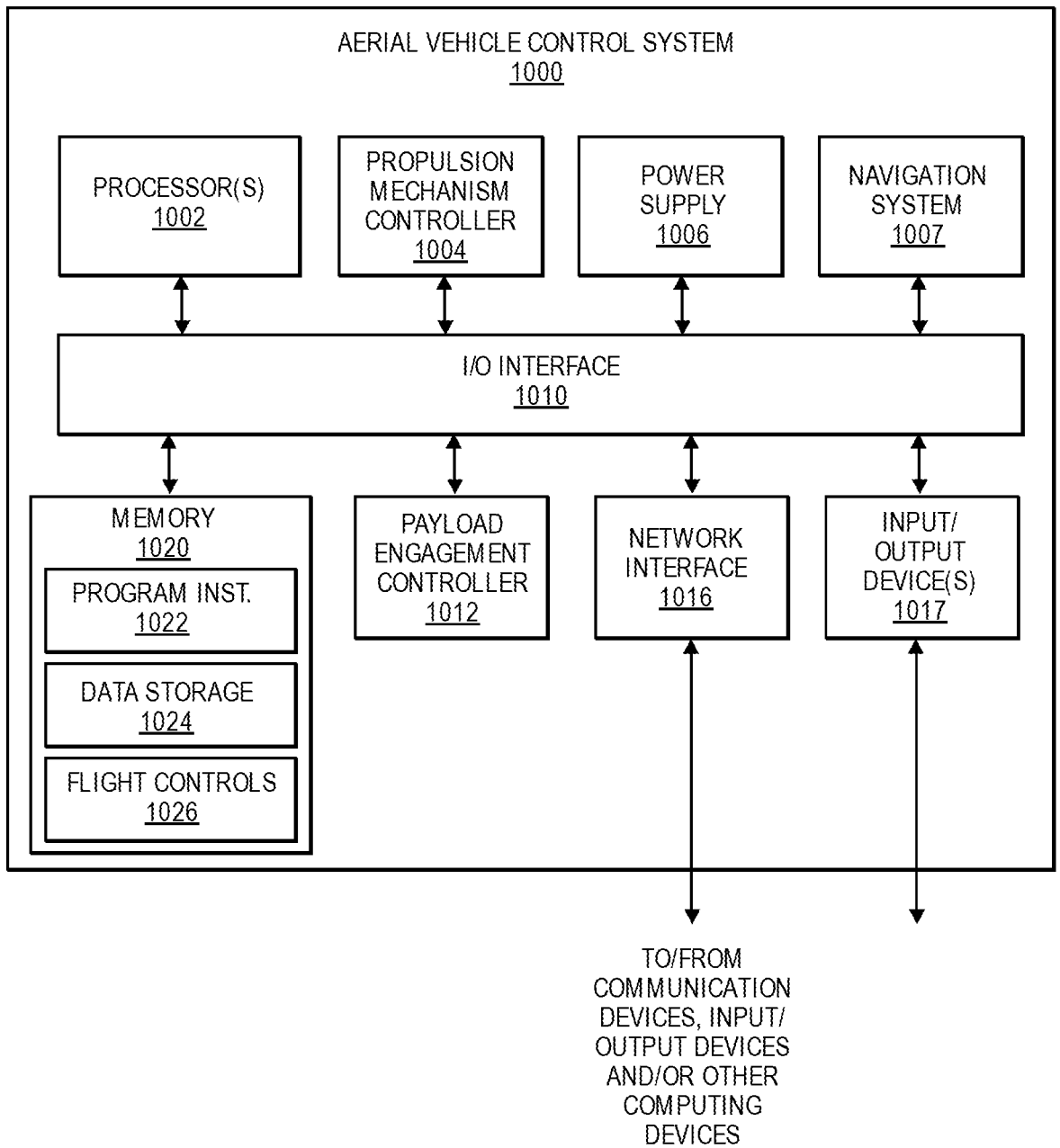
FIG. 10 is a block diagram illustrating various components of an example aerial vehicle control system, in accordance with disclosed implementations.

FIG. 10 is a block diagram illustrating various components of an example aerial vehicle control system 1000, in accordance with disclosed implementations.

In various examples, the block diagram may be illustrative of one or more aspects of the aerial vehicle control system 1000 that may be used to implement the various systems and methods discussed herein and/or to control operation of an aerial vehicle discussed herein. In the illustrated implementation, the aerial vehicle control system 1000 includes one or more processors 1002, coupled to a memory, e.g., a non-transitory computer readable storage medium 1020, via an input/output (I/O) interface 1010. The aerial vehicle control system 1000 also includes propulsion mechanism controllers 1004, such as electronic speed controls (ESCs) or motor controllers, power modules 1006 and/or a navigation system 1007. The aerial vehicle control system 1000 further includes a payload engagement controller 1012, a network interface 1016, and one or more input/output devices 1017.

In various implementations, the aerial vehicle control system 1000 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, flight paths, flight control parameters, center of gravity information, and/or data items accessible by the processor(s) 1002. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1020 as program instructions 1022, data storage 1024 and flight controls 1026, respectively. In other implementations, program instructions, data, and/or flight controls may be received, sent, or stored upon different types of computer-accessible media, such as non-transitory media, or on similar media separate from the non-transitory computer readable storage medium 1020 or the aerial vehicle control system 1000. Generally speaking, a non-transitory, computer readable storage medium may include storage media or memory media such as magnetic or optical media, e.g., disk or CD/DVD-ROM, coupled to the aerial vehicle control system 1000 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface or other peripheral interfaces, such as input/output devices 1017. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The propulsion mechanism controllers 1004 may communicate with the navigation system 1007 and adjust the rotational speed, position, orientation, or other parameters of each propulsion mechanism to implement one or more aerial vehicle flight plans or operations, to stabilize the aerial vehicle, and/or to perform one or more maneuvers and guide the aerial vehicle along a flight path and/or to a destination location. In addition, the propulsion mechanism controllers 1004, potentially in combination and/or communication with processor(s) 1002, navigation system 1007, information and data stored in memory 1020, and/or various input/output devices 1017, such as various types of sensors described herein, may implement all or a portion of the processes and methods described herein with respect to determining locations of interest on an aerial vehicle, measuring or determining vibrations or forces affecting all or a portion of the aerial vehicle, measuring or determining phases of one or more propellers, analyzing measured or determined vibrations and phases to determine adjustments to the phases, adjusting phases of one or more propellers to modify vibrations, instructing operation of one or more propellers with various phases or phase relationships, analyzing measured or determined vibrations and instructed phases relative to expected or nominal vibrations or forces, determining faults or failures of one or more portions of an aerial vehicle, validating one or more portions of an aerial vehicle, and/or any other operations or functions described herein.

The navigation system 1007 may include a global positioning system (GPS), indoor positioning system (IPS), or other similar system and/or sensors that can be used to navigate the aerial vehicle to and/or from a location. The payload engagement controller 1012 communicates with the actuator(s) or motor(s) (e.g., a servo motor) used to engage and/or disengage items.

The network interface 1016 may be configured to allow data to be exchanged between the aerial vehicle control system 1000, other devices attached to a network, such as other computer systems (e.g., remote computing resources), and/or with aerial vehicle control systems of other aerial vehicles. For example, the network interface 1016 may enable wireless communication between the aerial vehicle and an aerial vehicle control system that is implemented on one or more remote computing resources. For wireless communication, an antenna of the aerial vehicle or other communication components may be utilized. As another example, the network interface 1016 may enable wireless communication between numerous aerial vehicles. In various implementations, the network interface 1016 may support communication via wireless general data networks, such as a Wi-Fi network. For example, the network interface 1016 may support communication via telecommunications networks, such as cellular communication networks, satellite networks, and the like.

Input/output devices 1017 may, in some implementations, include one or more displays, imaging devices, thermal sensors, infrared sensors, time of flight sensors, accelerometers, pressure sensors, weather sensors, various other sensors described herein, etc. Multiple input/output devices 1017 may be present and controlled by the aerial vehicle control system 1000. One or more of these sensors may be utilized to control functions or operations related to adjusting phases of propellers to modify vibrations described herein, as well as to control wingborn or VTOL flight, effect transitions between wingborn and VTOL configurations, and/or any other operations or functions described herein.

As shown in FIG. 10, the memory may include program instructions 1022, which may be configured to implement the example routines and/or sub-routines described herein. The data storage 1024 may include various data stores for maintaining data items that may be provided for determining locations of interest, measuring vibrations, determining phases of propellers, analyzing vibrations and phases, adjusting phases of propellers to modify vibrations, instructing operation of propellers with particular phases or phase relationships, determining faults or failures of portions of an aerial vehicle, validating portions of an aerial vehicle, determining flight paths, landing, identifying locations for disengaging items, determining which propulsion mechanisms to utilize to execute a maneuver, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1000 is merely illustrative and is not intended to limit the scope of the present disclosure. In particular, the computing system and devices may include any combination of hardware or software that can perform the indicated functions. The aerial vehicle control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1000. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1000 may be transmitted to the aerial vehicle control system 1000 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and control systems should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle, comprising:
   a fuselage;
   six motor arms coupled to and extending from the fuselage;
   six motors, each motor coupled to a respective motor arm and positioned around the fuselage;
   six propellers, each propeller coupled to and rotated by a respective motor;
   a ring wing coupled to outer ends of the six motor arms and positioned around the fuselage, the six motors, and the six propellers, the ring wing comprising six wing sections; and
   a controller configured to at least:
      measure a vibration of at least a portion of the aerial vehicle;
      determine a respective phase of each propeller of the six propellers;
      determine an adjustment to the respective phase of at least one propeller of the six propellers; and
      adjust the respective phase of the at least one propeller based on the determined adjustment.

2. The aerial vehicle of claim 1, wherein the vibration of the at least a portion of the aerial vehicle is measured by at least one of an inertial measurement unit, an accelerometer, or a gyroscope associated with the aerial vehicle.

3. The aerial vehicle of claim 1, wherein the respective phase of each propeller of the six propellers is determined based at least in part on a respective state estimator associated with a respective motor controller of each propeller.

4. The aerial vehicle of claim 1, wherein the respective phase of the at least one propeller is adjusted by adjusting a rotational rate of a respective motor coupled to the at least one propeller.

5. A method, comprising:
   measuring a vibration associated with a location of interest on an aerial vehicle, the aerial vehicle comprising a plurality of propulsion mechanisms;
   determining respective phases of at least two propulsion mechanisms of the plurality of propulsion mechanisms; and
   adjusting a first phase of a first propulsion mechanism of the at least two propulsion mechanisms to modify the vibration associated with the location of interest.

6. The method of claim 5, further comprising:
   determining the location of interest on the aerial vehicle, wherein the location of interest is associated with at least one of a joint on the aerial vehicle, a damage on the aerial vehicle, or a sensor on the aerial vehicle.

7. The method of claim 6, wherein the location of interest is further determined based at least in part on a current portion of a flight plan associated with the aerial vehicle.

8. The method of claim 5, wherein the vibration associated with the location of interest is measured by at least one of an inertial measurement unit, a micro-electro-mechanical systems (MEMS) inertial measurement unit, an accelerometer, a gyroscope, or a magnetometer associated with the location of interest on the aerial vehicle.

9. The method of claim 5, wherein the respective phases of the at least two propulsion mechanisms are determined based at least in part on respective state estimators associated with respective propulsion mechanism controllers of the at least two propulsion mechanisms.

10. The method of claim 5, wherein the respective phases of the at least two propulsion mechanisms are determined based at least in part on respective sensors associated with the at least two propulsion mechanisms;
   wherein the respective sensors comprise at least one of resolvers, encoders, or Hall effect sensors.

11. The method of claim 5, further comprising:
   determining an adjustment of the first phase of the first propulsion mechanism based at least in part on a defined model correlating the vibration associated with the location of interest and respective phases of the plurality of propulsion mechanisms.

12. The method of claim 5, further comprising:
   determining an adjustment of the first phase of the first propulsion mechanism based at least in part on an adaptive control model.

13. The method of claim 5, wherein the first phase of the first propulsion mechanism is adjusted by adjusting a rotational rate of the first propulsion mechanism.

14. The method of claim 5, wherein the first phase of the first propulsion mechanism is adjusted by adjusting a drag associated with the first propulsion mechanism.

15. The method of claim 5, further comprising:
   determining that the vibration associated with the location of interest is outside a threshold range of an expected vibration associated with the location of interest; and
   determining a fault associated with the location of interest based at least in part on the vibration being outside the threshold range of the expected vibration.

16. A method to reduce vibration, comprising:
   determining a location of interest on the aerial vehicle;
   measuring a vibration associated with the location of interest on an aerial vehicle, the aerial vehicle comprising a plurality of propulsion mechanisms coupled to and extending from a fuselage;
   determining respective phases of at least two propulsion mechanisms of the plurality of propulsion mechanisms; and
   adjusting a first phase of a first propulsion mechanism of the at least two propulsion mechanisms to modify the vibration associated with the location of interest.

17. The method of claim 16, wherein the location of interest comprises a sensor associated with the aerial vehicle; and
   wherein the first phase of the first propulsion mechanism is modified to reduce the vibration associated with the sensor during aerial vehicle operations utilizing data from the sensor.

18. The method of claim 17, wherein the sensor comprises an imaging device associated with the fuselage; and
   wherein the first phase of the first propulsion mechanism is modified to reduce the vibration associated with the imaging device during vertical takeoff and landing (VTOL) operations utilizing imaging data from the imaging device.

19. The method of claim 16, wherein the location of interest comprises damage to a portion of the aerial vehicle; and
   wherein the first phase of the first propulsion mechanism is modified to reduce the vibration associated with the portion of the aerial vehicle.

20. The method of claim 16, wherein the vibration is measured by a sensor proximate the location of interest on the aerial vehicle.

* * * * *